US012719596B2

(12) United States Patent
Wang et al.

(10) Patent No.: US 12,719,596 B2
(45) Date of Patent: Aug. 25, 2026

(54) GEOMETRY-BASED STOCHASTIC CHANNEL MODELING METHOD FOR INDUSTRIAL INTERNET OF THINGS COMMUNICATIONS

(71) Applicants: Southeast University, Nanjing (CN); PURPLE MOUNTAIN LABORATORIES, Nanjing (CN)

(72) Inventors: Chengxiang Wang, Nanjing (CN); Yuxiao Li, Nanjing (CN); Li Zhang, Nanjing (CN); Songjiang Yang, Nanjing (CN); Yinghua Wang, Nanjing (CN); Jie Huang, Nanjing (CN)

(73) Assignees: Southeast University, Nanjing (CN); PURPLE MOUNTAIN LABORATORIES, Nanjing (CN)

( * ) Notice: Subject to any disclaimer, the term of this patent is extended or adjusted under 35 U.S.C. 154(b) by 0 days.

(21) Appl. No.: 18/814,842

(22) Filed: Aug. 26, 2024

(65) Prior Publication Data

US 2025/0080257 A1 Mar. 6, 2025

(30) Foreign Application Priority Data

Aug. 28, 2023 (CN) ......................... 202311087261.7

(51) Int. Cl.
*H04B 3/46* (2015.01)
*H04B 7/0452* (2017.01)
*H04B 17/391* (2015.01)

(52) U.S. Cl.
CPC ......... *H04B 17/391* (2015.01); *H04B 7/0452* (2013.01)

(58) Field of Classification Search
CPC ... H04L 25/0212; H04B 17/391; H04B 17/12; H04B 7/15528; H04B 7/04026;
(Continued)

(56) References Cited

U.S. PATENT DOCUMENTS

2017/0150480 A1* 5/2017 Kim ........................ H04L 67/12
2017/0359739 A1* 12/2017 Reed ..................... H04W 16/28
2024/0178933 A1* 5/2024 Zewail ................. H04B 7/0452

* cited by examiner

*Primary Examiner* — Khai Tran
(74) *Attorney, Agent, or Firm* — MUNCY, GEISSLER, OLDS & LOWE, P.C.

(57) ABSTRACT

Disclosed by the present disclosure is a geometry-based stochastic channel modeling method for an IIoT channel. The method includes the following steps: S1, setting a propagation scenario, propagation conditions, model parameters, an antenna configuration, and the like, S2, generating large-scale parameters with a spatial consistency; S3, determining a number of initial clusters, a number of specular multipath components generated in each of clusters and a number of dense multipath components generated in each of the clusters, determining a visibility of an array antenna to the clusters, generating an initial delay of the clusters, an angle of the clusters, and a power of the clusters, and generating channel coefficients between each pair of transmitter antennas and receiver antennas; S4, updating the positions of the transmitters and the positions of the receivers as well as values for the large-scale parameters according to the motion trajectories of the transmitters and the motion trajectories of the receivers; S5, applying a birth and death process of the clusters to initialize new clusters and update angles, delays and powers of surviving clusters, and generating the channel coefficients; and S6, returning to Step S4, until traversing motion trajectories of the transmitters and the motion trajectories of the receivers; calculating statistical characteristics of the channel, and verifying channel model according to actual measurement data. For the first time, the present disclosure considers 6G channel modeling requirements and dense multipath characteristics, and are verified through actual measurements, which is of great significance for the standardization of IIoT channel models.

8 Claims, 3 Drawing Sheets

(58) Field of Classification Search
CPC .............. H04B 17/3912; H04B 7/0617; H04B 7/0452; H04W 24/10; H04W 16/22; H04W 4/40
USPC .......................................................... 375/224
See application file for complete search history.

CDF

Ray-tracing

GBSM $\log_{10}$DS(°)

$\log_{10}$ASD(°)

GEOMETRY-BASED STOCHASTIC CHANNEL MODELING METHOD FOR INDUSTRIAL INTERNET OF THINGS COMMUNICATIONS

TECHNICAL FIELD

The present disclosure relates to a geometry-based stochastic channel modeling method for an industrial Internet of things communications, and validate the proposed method for modeling channel according to channel measurement data and ray tracing simulation data of the actual industrial Internet of things scenarios. And the present disclosure belongs to a technical field of wireless communication.

BACKGROUND

Industrial Internet of Things (IIoT) is one part of the concept of Internet of Things (IoT), whose communication network is composed of intelligent computers, devices, and objects that can collect and share a large amount of data, and the IIoT collects data and integrates the data into cloud servers, implementing the end-user sharing. The IoT enhances the automation level of many industries such as homes and schools. The applications of IoT in the manufacturing industry is called as IIoT. IIoT promises to implement efficient access and retrieval of larger amounts of data at a faster speed, which can greatly improve the security, the interconnectivity, the scalability, and the efficiency of the industrial organizations, save time and costs, and fundamentally vary the manufacturing industry.

Fifth Generation Mobile Communication (5G) technology and IIoT enable the smart factories to create a wireless network connecting machines, humans, and the clouds, allowing for the instant collection, the analysis, and the distribution of the real-time data. Sixth Generation Mobile Communication (6G) has three enhanced requirements relative to 5G, that is, Further Enhanced Mobile Broadband (Further-eMBB), Ultra-Machine-Type Communications (Ultra-mMTC), and Enhanced Ultra-Reliable and Low-Latency Communications (enhanced uRLLC), which will further promote the developments of IIoT, truly bringing together the massive machines, the high-speed data analysis, and humans, providing unprecedented values. IIoT communication with ultra-low latency and ultra-high reliability, as well as efficient and energy-saving wireless network control also play an important role in the strong security or endogenous security of 6G wireless communication networks.

Starting from the Third Generation Partner Project (3GPP), the Geometry-Based Stochastic Model (GBSM) model enters 5G standardization. Compared with the narrowband models and the Ultra-Wideband (UWB) models, GBSM not only extends the application frequency band of GBSM to millimeter waves and adds three-dimensional angle information into GBSM, but also is suitable for statistical analysis of channel characteristics, and has become one of the commonly used methods for modeling 5G, Beyond 5G (B5G), and 6G channels. However, the European Cooperation in the Field of Science and Technology (COST) proposed that wireless channel models contain Dense Multipath Components (DMC), which is more pronounced in indoor scenarios, especially in IIoT scenarios with rich metal scatterers, after observing that reflection paths alone are currently insufficient to explain all multipath energy in wireless channels. It is also found in a large number of channel measurements that the channel impulse response in IIoT scenarios can be described as the sum of Specular Multipath Components (SMC) and DMC. The DMC comes from distributed diffuse scatterers or contains wireless channel energy that cannot be associated with SMC, without considering the exact propagation mechanism. Other indoor scenarios also have DMC, but the DMC power proportion in IIoT environment is approximately 4% to 13% higher than that in general indoor office scenarios, possibly between 37% and 80%. Therefore, the contribution of DMC in this scenario is greater and is worthy of further research. Although 3GPP has initially standardized the IIoT scenario channel model, the model still lacks in a scenario partitioning, a frequency band spread, a time-varying characteristic modeling, a DMC characteristic modeling, and other aspects.

SUMMARY

Technical Problems

The objectives of the present disclosure are to provide a geometry-based stochastic channel modeling method for an IIoT communications, and an experimentally verification method thereof. The method supports a spatial consistency, a massive Multiple-Input-Multiple-Output (MIMO), a large bandwidth at millimeter wave bands, a time-domain non-stationary characteristics, a multi mobility, a spatial non-stationary characteristics and the like, can also describe the rich dense multipath components in IIoT scenarios; substitutes the antenna configuration and the parameters measured by the actual IIoT channel into the model, and performs a parameter estimation and a model validation based on the Minimum Mean Square Error (MMSE) criterion.

Technical Solutions

In the geometry-based stochastic channel modeling method for the IIoT communications, and the experimentally verification method thereof provided by the present disclosure, the transmitters and the receivers all support the massive MIMO arrays. In a case of using a small number of antenna arrays instead of the massive MIMO, there is no need to consider the evolution of the clusters on the arrays. The geometry-based stochastic modeling channel for the IIoT and the experimental verification method thereof specifically includes following steps.

In Step S1, a propagation scenario, propagation conditions, model parameters, an antenna configuration, a layout, and motion trajectories of the transmitters and motion trajectories of the receivers and the like are set.

The present disclosure innovatively divides the industrial Internet of things channel impulse response into two parts, that is, SMC and DMC, in which the delay, the angle and the power are modeled respectively. The model considers spherical waves, and the distances and angles of the different antennas in the array relative to the clusters are different. The antenna arrays are transformed from the Local Coordinate System (LCS) to the Global Coordinate System (GCS) through the coordinate transformation, and the schematic diagram of the model is illustrated in FIG. 2. The transmitters and the receivers can be a linear array, a planar array, or a cylindrical array. In a case where one terminal is modeled as a cylindrical array, the center of the cylinder is adopted as a LCS coordinate origin. However, in a case calculating the evolution of the array axis of the clusters, it is assumed that the antenna interval is the interval between two adjacent antennas on the horizontal plane. The angle (delay) power spectrum density of the DMC is not a Gaussian stochastic distribution of the angle (delay), but has a similar propagation mechanism with the SMC part of the channel and is significantly correlated with the SMC. In the model, the impulse response of indoor factory scenarios is divided into three parts, and it is assumed that the scatterers generating the DMC are distributed around the scatterers generating the SMC. In each of the clusters $C_n$, the scatterer that generates the $s_n$-th SMC is expressed as $S_{s_n}$, and the scatterer that generates the $m_n$-th DMC is expressed as $S_{m_n}$. The model is a twin-cluster model, and the scattering environment is modeled as an equivalent cluster $C_n$. The delay of the total link where $C_n$ is located in is composed of the delay from the transmitter (Tx) to $C_n$ (the first-bounce), the delay from the receiver (Rx) to $C_n$ (the last-bounce), and the virtual link delay between the first-bounce and the last-bounce. In a case where the clusters $C_n$ cannot be observed by the Tx or the Rx, these signals cannot be received by the Rx, and these clusters are invisible to the receivers at this time instant.

$$A_p^T(t) \text{ and } A_q^R(t)$$

denote the three-dimensional coordinate vectors for the p-th antenna element in the transmitter antenna array and the three-dimensional coordinate vector for the q-th antenna element in the receiver antenna array, respectively. The transmitters and the receivers are movable, thus the coordinate vector varies with the time instant t, and $v^R$, $v^T$ denote the three-dimensional velocity vectors for the receiver (transmitter) array, respectively. The distance between two adjacent antenna elements of the transmitter antenna and the receiving antenna is expressed as $\delta_T(\delta_R)$.

$$\psi_A^R, \psi_E^R$$

denotes the azimuth angle of the receiver antenna array and the elevation angle of the receiver antenna array, respectively, and $$\psi_A^T, \psi_E^T$$

denote the azimuth angle of the transmitter antenna array and the elevation angle of the transmitter antenna array, respectively.

$$\phi_s^A(t), \phi_{s_n}^E(t)$$

denote the azimuth angle and the elevation angle between $S_{s_n}$ and the center of the receiver array, respectively, $$\varphi_{s_n}^A(t), \varphi_{s_n}^E(t)$$

denote the azimuth angle and the elevation angle between $S_{s_n}$ and the center of the transmitter array, respectively, $$\phi_{m_n}^A(t), \phi_{m_n}^E(t)$$

denote the azimuth angle and the elevation angle between $S_{m_n}$ and the center of the receiver array, respectively, and $$\varphi_{m_n}^A(t), \varphi_{m_n}^E(t)$$

denote the azimuth angle and the elevation angle between $S_{m_n}$ and the center of the transmitter array, respectively. D denotes the three-dimensional coordinate vector for the center of the receiver antenna array, $$D_{pq}^{LoS}(t)$$

denotes the 3D distance vector for the LoS path from the transmitter antenna $$A_p^T$$

to the receiver antenna $$A_p^R, D_{s_n}^R(t), D_{s_n}^T(t)$$

denote the 3D distance vector from $S_{s_n}$ to the center of the receiver (transmitter) array, respectively, $$D_{q,s_n}^R(t), D_{p,s_n}^T(t)$$

denote the 3D distance vector from $S_{s_n}$ to the receiver antenna $$A_p^R$$

(transmitter antenna $$A_p^T),$$

respectively;

$$D_{m_n}^R(t), D_{m_n}^T(t)$$

denote the 3D distance vector from $S_{m_n}$ to the center of the receiver (transmitter) array, respectively, $$D_{q,m_n}^R(t), D_{p,m_n}^T(t)$$

denote the 3D distance vector from to the receiver antenna $$A_p^R$$

(transmitter antenna $$A_p^T),$$

respectively; and $$v_n^R,\ v_n^T$$

denote the 3D velocity vector for the last hop cluster and the 3D velocity vector for the first hop cluster, respectively.

In Step S2, large-scale parameters with a spatial consistency are generated according to different positions of the transmitters and the receivers measured by an actual channel. The coordinate vectors $P=(P^T, P^R)$ for the transmitters and the receivers at different time instants are substituted into the model, and large-scale parameters with a space consistency are generated. The parameters include a shadowing fading SH, a delay spread DS, an azimuth spread of arrival ASA, an azimuth spread of departure ASD, an elevation spread of arrival ESA, an elevation spread of departure ESD, a Rice factor K, and a cross polarization ratio XPR. A generation of the delay spread DS is taken as an example, and a mean for generating other large-scale parameters are similar, and the formula is expressed as $$DS_f(P) = DS_{\mu,f} + X^{DS}(P)\cdot DS_{\sigma,f},$$

where $P=(P^T, P^R)$ is composed of vectors for the positions of the transmitters and vectors for the positions of the receivers, $P^T(t)=(x^T(t),y^T(t),z^T(t))^T$, and $P^R(t)=(x^R(t),y^R(t),z^R(t))^T$ denote coordinate vectors for the transmitters at a time instant t and coordinate vectors for the receivers at the time instant t, respectively, and initial values for the coordinate vectors for the transmitters and initial values for the coordinate vectors for the receivers are generated according to simulation environment and requirements; $DS_{\mu,f}$ denotes a mean value for DS in the f-th frequency band, and $DS_{\sigma,f}$ denotes a standard deviation for DS in the f-th frequency band; $X^{DS}(P)$ denotes a variable that follows a spatial consistency of a normal distribution with a mean of 0 and a variance of 1, and a generation formula of $X^{DS}(P)$ is expressed as $$\overline{X}^{DS}(x_t, y_t, z_t, x_r, y_r, z_r) = \frac{\tilde{X}^{DS}(x_t, y_t, z_t) + \tilde{X}^{DS}(x_r, y_r, z_r)}{2\cdot\sqrt{\rho_\tau(d_{tr})+1}}$$

$$\rho_\tau(d_{tr}) = \begin{cases} \exp\left(-\frac{d_{tr}^2}{d_\lambda^2}\right), & d_{tr} < d_\lambda \\ \exp\left(-\frac{d_{tr}}{d_\lambda}\right), & d_{tr} \ge d_\lambda \end{cases},$$

where $\tilde{X}^{DS}$ denotes a stochastic variable that follows the normal distribution with the mean of 0 and the variance of 1 generated by a Sum-of-Sinusoids (SoS) mean, $d_{tr}$ denotes distances between the transmitters and the receivers, $d_\lambda$ denotes a parameter decorrelation distance; $\rho_\tau(d_{tr})$ denotes an autocorrelation value for $\tilde{X}^{DS}$ in a case of $d=d_{tr}$. Eight large-scale parameters are independently generated by adopting this mean, and then multiplied by the cross-correlation matrix $R^{1/2}$ between the large-scale parameters to obtain the values for all large-scale parameters with the spatial consistency in the logarithmic domain, and which is expressed as following formula. Finally, the values in the logarithmic domain are required to be converted to the linear domain.

$$\begin{bmatrix} X^{DS}(P) \\ X^{KF}(P) \\ X^{SH}(P) \\ X^{ASD}(P) \\ X^{ASA}(P) \\ X^{ESD}(P) \\ X^{ESA}(P) \\ X^{XPR}(P) \end{bmatrix} = R^{1/2} \begin{bmatrix} \overline{X}^{DS}(P) \\ \overline{X}^{KF}(P) \\ \overline{X}^{SH}(P) \\ \overline{X}^{ASD}(P) \\ \overline{X}^{ASA}(P) \\ \overline{X}^{ESD}(P) \\ \overline{X}^{ESA}(P) \\ \overline{X}^{XPR}(P) \end{bmatrix}.$$

In Step S3, the number of initial clusters, the number of specular multipath components generated in each of clusters and the number of dense multipath components generated in each of the clusters are determined. And a visibility of the clusters to a MIMO array antenna is determined. An initial delay of the clusters, an angle of the clusters, and a power of the clusters are generated and channel coefficients between each pair of the transmitter antennas and the receiver antennas are generated.

In Step S301, the number of the initial clusters, the number of specular multipath components generated in each of clusters and the number of dense multipath components generated in each of the clusters are determined. And a visibility of the clusters to a MIMO array antenna is determined. The event that "the cluster is visible to the antenna" has a certain probability, that is, the visible probability. The visible probability of the clusters to transmitter antennas and a visible probability of the clusters to receiver antennas on an array axis at an initial time instant are related to the distances between the transmitting antennas and the receiving antennas, and the visible probability of the clusters to the transmitting antennas and the visible probability of the clusters to the receiving antennas are respectively defined as $$\begin{cases} P_T(\|A_p^T - A_{p'}^T\|) = \exp\left(-\lambda_R \frac{\|A_p^T - A_{p'}^T\|}{D_c^s}\right) \\ P_R(\|A_q^R - A_{q'}^R\|) = \exp\left(-\lambda_R \frac{\|A_q^R - A_{q'}^R\|}{D_c^s}\right) \end{cases},$$

where $$D_c^s$$

denotes a spatial correlation coefficient, $\lambda_R$ denotes a recombination rate of the clusters, $$\|A_p^T - A_{p'}^T\| \text{ and } \|A_q^R - A_{q'}^R\|$$

denote a distance between a transmitting antenna p and a transmitting antenna p', as well as a distance between a receiving antenna and a receiving antenna q', respectively.

In Step S302, the initial delay of the clusters, the angle of the clusters, and the power of the clusters are generated. In an angle domain, $$\left[\phi_n^{AOA}, \phi_n^{EOA}, \phi_n^{AOD}, \phi_n^{EOD}\right]$$

is expressed as an included angle between a center of the clusters and the transmitters or the receivers, and $$\left[\phi_n^{AOA}, \phi_n^{EOA}, \phi_n^{AOD}, \phi_n^{EOD}\right]$$

is modeled as a wrapped Gaussian distribution with a standard deviation of $$\left[std(\phi_n^A), std(\phi_n^E), std(\varphi_n^A), std(\varphi_n^E)\right].$$

In view of a SMC component, based on the included angle between the center of the clusters, a stochastic Laplace-distribution angle offset with a mean of zero and a standard deviation of 1 degree (0.017 radians) is added, and a motion angle of $S_{s_n}$ and a motion angle of $S_{m_n}$ are obtained, which is expressed as $$\left[\phi_{n,s_n(m_n)}^{AOA}, \phi_{n,s_n(m_n)}^{EOA}, \phi_{n,s_n(m_n)}^{AOD}, \phi_{n,s_n(m_n)}^{EOD}\right] = \left[\phi_n^{AOA}, \phi_n^{EOA}, \phi_n^{AOD}, \phi_n^{EOD}\right] + \left[\Delta\phi_{s_n(m_n)}^{AOA}, \Delta\phi_{s_n(m_n)}^{EOA}, \Delta\phi_{s_n(m_\eta)}^{AOD}, \Delta\phi_{s_n(m_n)}^{EOD}\right],$$

where $$\left[\Delta\phi_{s_n}^{AOA}, \Delta\phi_{s_n}^{EOA}, \Delta\phi_{s_n}^{AOD}, \Delta\phi_{s_n}^{EOD}\right]$$

denotes a stochastic angle offset that follows a Laplace-distributed stochastic angle offset with a mean of zero and a standard deviation of 1 degree (0.017 radians). In view of the DMC component, the DMC has a greater angle diffusion than the SMC. The standard deviation $$\left[\Delta\phi_{m_n}^{AOA}, \Delta\phi_{m_n}^{EOA}, \Delta\phi_{m_n}^{AOD}, \Delta\phi_{m_n}^{EOD}\right]$$

for the angle offset of the DMC is modeled as a scenario related constant, with typical values such as 3, 5, and 10 degrees.

In a delay domain, a delay calculation formula for a LOS component and a delay calculation formula for the SMC component are respectively expressed as $$\tau^{LOS}(t) = \left\|D_{pq}^{LOS}(t)\right\|/c$$

$$\tau_{s_n}^{SMC}(t) = \tau_n(t) + \tau_{s_n},\ \tau_n(t) = \left(\left\|D_{s_n}^R(t)\right\| + \left\|D_{s_n}^T(t)\right\|\right)/c + \tilde{\tau}_n,$$

where $$\left\|D_{pq}^{LOS}(t)\right\|$$

denotes a distance between the transmitting antenna p and the receiving antenna q, $\tau^{LOS}(t)$ denotes a delay of a line-of-sight path between the transmitting antenna p and the receiving antenna q, $\tau_n(t)$ denotes a delay of a link where the center of the clusters $C_n$ is located, $zS_n$ denotes a delay offset caused by a distance offset of $S_{s_n}$ relative to a cluster centroid, following an exponential distribution; and a virtual link delay is expressed as $\tilde{\tau}_n = -r_\tau \sigma_\tau \ln \mu_n$, where $\mu_n \sim U[0,1]$, $r_\tau$ denotes a delay scalar and $\sigma_\tau$ denotes a delay spread.

In view of the DMC component, a delay scale factor $$S_{dmc}^{\tau}$$

and a power attenuation factor $\beta_{dmc}$ are innovatively introduced for modeling. Considering that the delay of the DMC is not only caused by the scatterers that are visible to the Tx and the Rx, but also by scattering phenomena caused by the scatterers hidden between the visible scatterers. Thus the introduced delay scale factor $$S_{dmc}^{\tau} > 1$$

describes the geometric spread of the DMC. On the basis of the SMC component, an additional DMC delay $\tau_{add}$ caused by the scattering phenomenon of the scatterers between the visible clusters is added, that is $$\tau_{m_n}^{DMC}(t) = \tau_{s_n}^{SMC}(t) + \tau_{add},$$

where, $$\tau_{add} = \xi S_{dmc}^{\tau}\beta_{dmc},\ \xi$$

follows a uniform distribution between 0 and 1, $\beta_{dmc}$ denotes a power attenuation factor, and expresses an additional delay relative to a strongest SMC, and the strongest SMC attenuates a DMC power to 1/e relative to a basic power $P_{s_n}(t)P_{off}$.

In a power domain, a calculation formula for a power of a specular multipath caused by $S_{s_n}$ in the clusters $C_n$ is expressed as:

$$\tilde{P}_{S_n}^{SMC}(t) = \exp\left(-\tau_{S_n}^{SMC}(t)\frac{r_\tau - 1}{r_\tau\sigma_\tau}\right)10^{-Z_n/10},$$

where $r_\tau$ denotes a delay scalar, $\sigma_\tau$ denotes a delay spread, $Z_n \sim N(0,\sigma_{cluster})$, and $\sigma_{cluster}$ (dB) denotes a shadow standard deviation of each of the clusters;

a mean for normalizing is expressed as $$P_{s_n}^{SMC}(t) = P_{SMC}(t)\tilde{P}_{s_n}^{SMC}(t) / \sum_{n=1}^{N(t)}\sum_{s=1}^{S_n(t)}\tilde{P}_{s_n}^{SMC}(t),$$

where $P_{SMC}(t)$ denotes a total power of the SMC component;

a calculation formula for a power of a dense multipath caused by $S_{m_n}$ in the clusters $C_n$ is expressed as:

$$\tilde{P}_{m_n}^{DMC}(t) = \max\{P_{s_n}^{SMC}(t)\} \times P_{off} \exp\left(-\frac{\tau_{m_n}^{DMC}(t) - \tau_{s_n}^{SMC}(t)}{\beta_{dmc}}\right),$$

where $$\max\{P_{s_n}^{SMC}(t)\}$$

denotes a SMC with the highest power in the clusters $C_n$, and $P_{off}$ denotes a power offset;

a mean for normalizing is expressed as $$P_{m_n}^{DMC}(t) = P_{DMC}(t)\tilde{P}_{m_n}^{DMC}(t) / \sum_{n=1}^{N(t)} \sum_{m=1}^{M_n(t)} \tilde{P}_{m_n}^{DMC}(t)$$

$P_{off}$ exp, where $P_{DMC}(t)$ denotes a total power of the DMC component.

An adjustable DMC power ratio is introduced, the DMC power ratio expresses the relative power of the wireless channel DMC components in different IIoT scenarios. It is known that the power ratio of the LOS and the NLOS is a K-factor, and therefore, the power of the DMC is limited by the DMC power ratio $\eta_{DMC}$ and the Rice factor:

$$\eta_{DMC}(t) = P_{DMC}(t)/(P_{DMC}(t) + P_{SMC}(t) + P_{LOS}(t)),$$

$$P_{LOS}(t) = K(P_{DMC}(t) + P_{SMC}(t)),$$

where K denotes the Rice factor, $P_{DMC}(t)$, $P_{SMC}(t)$, and $P_{LOS}(t)$ denote a total power of the DMC component, a total power of the SMC component, and a total power of the LOS component, respectively.

A small-scale fading power is normalized and it is assumed that a DMC power ratio is time-invariant, which is expressed as $$P_{DMC} = \eta_{DMC},\ P_{SMC} = \frac{1}{K+1} - \eta_{DMC},\ P_{LOS} = \frac{K}{K+1},$$

where a power of the SMC is positive. Therefore, it is necessary to satisfy $\eta_{DMC}<1/(K+1)$, which also indicates that in the LOS scenarios with relative high K factors, the power ratio of the DMC is limited, and in general, the power ratio of the DMC in NLOS scenarios is greater than that in the LOS scenarios.

In Step S303, the channel coefficients between each pair of the transmitters and the receivers are generated. The small-scale fading, the path loss, and the shadow fading modeling are taken into consideration comprehensively, and a matrix of the industrial Internet of things channel is expressed as $$H = [PL \cdot SH]^{1/2} \cdot H_s,$$

where PL,SH denotes a large-scale fading, PL denotes a path loss, SH denotes the shadowing, and $H_s$ denotes a matrix of a small-scale fading channel.

The matrix of a small-scale fading channel $H_s$ is expressed as $$H_s(t, \tau) = [h_{qp}(t, \tau)]_{M_T \times M_R},$$

where $M^T$ denotes the number of antenna elements in a transmitting antenna array, $M_R$ denotes the number of antenna elements in a receiving antenna array, $h_{qp}(t,\tau)$ denotes a channel impulse response between a transmitting antenna element $$A_p^T$$

and a receiving antenna element $$A_q^R, \text{ and } h_{qp}(t, \tau)$$

is composed of a line-of-sight (LOS) component and a non-line-of-sight (NLOS) component; and a calculation formula $h_{qp}(t,\tau)$ is expressed as $$h_{qp}(t, \tau) = h_{qp}^{LOS}(t)\delta[(\tau - \tau_{qp}^{LOS}(t))] + \sum_{n=1}^{N(t)} \sum_{s=1}^{S_n(t)} h_{qp,s_n}^{SMC}\delta[\tau - \tau_{s_n}^{SMC}(t)] + \sum_{n=1}^{N(t)} \sum_{m=1}^{M_n(t)} h_{qp,m_n}^{DMC}(t)\delta[\tau - \tau_{m_n}^{DMC}(t)],$$

where the first item is the LOS component, and the second item and the third item are the SMC and the DMC, respectively; N(t) denotes the number of the clusters, $S_n(t)$ denotes the stochastic number of scatterers that generate the SMC, and $M_n(t)$ denotes the stochastic number of relative small scatterers that generate the DMC; assuming that $S_n(t)$ and $M_n(t)$ follow a Poisson distribution with an arrival rate of $\tilde{\lambda}_{smc}$ and $\tilde{\lambda}_{dmc}$, respectively; and a channel coefficient $$h_{qp}^{LOS}(t)$$

for the LOS component and a channel coefficient $$h_{qp,m_n}^{DMC}(t)$$

for the DMC are expressed as $$h_{qp}^{LOS}(t) = \begin{bmatrix} F_{p,V}^T(D_{qp}^{LOS}(t), A_p^T(t)) \\ F_{p,H}^T(D_{qp}^{LOS}(t), A_p^T(t)) \end{bmatrix}^T \begin{bmatrix} 1 & 0 \\ 0 & -1 \end{bmatrix} \begin{bmatrix} F_{q,V}^R(D_{qp}^{LOS}(t), A_q^R(t)) \\ F_{q,H}^R(D_{qp}^{LOS}(t), A_q^R(t)) \end{bmatrix} \sqrt{P_{LOS}(t)}\, e^{j\{2\pi f_{qp}^{LOS}(t)t + \Phi_{qp}^{LOS}(t)\}}$$

$$h_{qp,m_n}^{DMC}(t) = \begin{bmatrix} F_{p,V}^T(D_{p,m_n}^T(t), A_p^T(t)) \\ F_{p,H}^T(D_{p,m_n}^T(t), A_p^T(t)) \end{bmatrix}^T \begin{bmatrix} e^{j\Phi_{m_n}^{VV}} & \sqrt{\kappa_{m_n}}\, e^{j\Phi_{m_n}^{VH}} \\ \sqrt{\kappa_{m_n}}\, e^{j\Phi_{m_n}^{HV}} & e^{j\Phi_{m_n}^{HH}} \end{bmatrix} \begin{bmatrix} F_{q,V}^R(D_{q,m_n}^R(t), A_q^R(t)) \\ F_{q,H}^R(D_{q,m_n}^R(t), A_q^R(t)) \end{bmatrix} \sqrt{P_{m_n}^{DMC}(t)}\, e^{j\{2\pi(f_{q,m_n}^R(t) + f_{p,m_n}^T(t))t + \Phi_{qp,m_n}^{NLOS}(t)\}},$$

where $$F^{T}_{p,V(H)} \text{ and } F^{R}_{q,V(H)}$$

denote a directional pattern of an antenna unit $$A^{T}_{p}$$

corresponding to a vertical polarization and a directional pattern of an antenna unit $$A^{R}_{q}$$

corresponding to a horizontal polarization, respectively. $\kappa_{m_n}(t)$ denotes a cross polarization power ratio, $$\Phi^{VH}_{m_n}, \Phi^{VV}_{m_n}, \Phi^{HV}_{m_n} \text{ and } \Phi^{HH}_{m_n}$$

denote stochastic phases that follow a uniform distribution of (0,2π], $$\Phi^{LOS}_{qp}(t) = 2\pi\left\|D^{LOS}_{pq}(t)\right\|/\lambda_c \text{ and } \Phi^{NLOS}_{qp,m_n}(t) = 2\pi\left(\left\|D^{R}_{q,m_n}(t) + D^{T}_{p,m_n}(t)\right\|\right)/\lambda_c$$

denote an initial phase of $$A^{R}_{q}$$

under the LOS and an initial phase of $$A^{T}_{p}$$

under the NLOS, respectively, and $$f^{T}_{p,m_n} \text{ and } f^{R}_{q,m_n}$$

denote a Doppler frequency offset caused by a motion of the transmitting antennas relative to $S_{m_n}$, and a Doppler frequency offset caused by a motion of the receiving antennas relative to $S_{m_n}$, respectively.

$$f^{R}_{q,m_n}$$

is taken as an example, $$f^{R}_{q,m_n}(t) = \left\langle D^{R}_{q,m_n}(t), v^{R} - v^{R}_{n}\right\rangle/\lambda_c\left\|D^{R}_{q,m_n}(t)\right\|,$$

where <•,•> denotes an inner product, ||•|| denotes a calculation of Frobenius norm.

$$f^{T}_{p,s_n}(t), f^{R}_{q,s_n}(t), f^{T}_{p,m_n}(t) \text{ and } f^{LOS}_{qp}(t)$$

can be obtained by similar calculations, respectively.

$$f^{T}_{p,s_n}(t) \text{ and } f^{R}_{q,s_n}(t)$$

denote the Doppler frequency offset caused by the motion of the transmitter antennas relative to $S_{s_n}$, and the Doppler frequency offset caused by the motions of the receiver antennas relative to $S_{s_n}$, respectively.

$$f^{LOS}_{qp}(t)$$

denotes the Doppler frequency offset caused by the relative motions between the transmitter antennas and the receiving antennas.

$$P_{LOS}(t) \text{ and } P^{DMC}_{m_n}(t)$$

denote the power of the LOS component and the power of the DMC component, respectively. All the above parameters are time-varying parameters. The channel coefficient $$h^{SMC}_{qp,s_n}(t)$$

of the SMC component is similar to that of the DMC component and can be obtained by substituting $m_n$ with $s_n$.

In Step S4, the positions of the transmitters and the positions of the receivers as well as values for the large-scale parameters are updated according to the motion trajectories of the transmitters and the motion trajectories of the receivers. The motions of the transmitters and the receivers lead to variations of the position coordinates of the transmitters and the receivers. After a time interval Δt, the coordinates of the antenna are updated to $$A^{R}_{q}(t+\Delta t) = A^{R}_{q}(t) + v^{R}\Delta t$$
$$A^{T}_{p}(t+\Delta t) = A^{T}_{p}(t) + v^{T}\Delta t.$$

Meanwhile, according to the method in Step S2, the coordinate vectors $P=(P^T, P^R)$ of the transmitters and the receivers at different time instants are substituted into the model to update the large-scale parameters for the channel at the time instant t+Δt.

In Step S5, a birth and death process of the clusters is applied to initialize new clusters and update angles, delays and powers of surviving clusters, and the channel coefficients are generated, the steps specifically include following steps.

In Step S501, the birth and death process of the clusters is classified into a birth and death process on a time axis and a birth and death process on an array axis, on the time axis, a visible probability of the clusters after a time interval Δt is expressed as $$P_T(\Delta t) = \exp\left(-\lambda_R \frac{P_F(\Delta v^R + \Delta v^T)\Delta t}{D_c^s}\right),$$

where $$\Delta v^R = E[\|v^R - v_n^R\|] \text{ and } \Delta v^T = E[\|v^T - v_n^T\|]\Delta v^T = E[\|v^T - v_n^T\|]$$

denote an average relative velocity of $\text{Cluster}_n$ relative to the receiving antennas and average relative velocity of $\text{Cluster}_n$ relative to the transmitting antennas, respectively, $P_F$ denotes a percentage of moving clusters; new clusters are generated at a time instant t+Δt, the number of newly generated clusters follows a Poisson distribution, and an expectation is expressed as:

$$E[N_{new}(t+\Delta t)] = \frac{\lambda_G}{\lambda_R}(1 - P_T(\Delta t)),$$

where on the array axis, a visibility of the newly generated clusters to antennas is determined by a relevant distance; the relevant distance r is defined as an exponential distribution variable, $$E[r] = \lambda_R / D_c^a, \text{ where } D_c^a$$

is a parameter related to environment. The receiving array is taken as an example, in a case of determining antennas to which the newly generated clusters $\text{Cluster}_n$ are visible, firstly, a receiving antenna $p_0$ is randomly selected and $\text{Cluster}_n$ is determined to be visible to $p_0$; then, for other antennas, when satisfying $$\|A_{p_i}^R - A_{p_0}^R\| \leq r,$$

$\text{Cluster}_n$ is determined to be visible to an antenna $p_i$, otherwise, $\text{Cluster}_n$ is determined to be invisible to the antenna $p_i$.

In Step S502, after the time interval Δt, a variation of coordinates of the transmitting antennas and the receiving antennas, a distance coordinate vector for the clusters, and a delay of the clusters are updated to $$D_n^R(t+\Delta t) = D_n^R(t) + v_n^R \Delta t$$

$$D_n^T(t+\Delta t) = D_n^T(t) + v_n^T \Delta t$$

$$\tau_n(t+\Delta t) = [\|D_n^R(t+\Delta t)\| + \|D_n^T(t+\Delta t)\|]/c + \tilde{\tau}_n(t+\Delta t),$$

where a stochastic variable $\tilde{\tau}_n(t+\Delta t)$ is modeled as $$\tilde{\tau}_n(t+\Delta t) = e^{-\frac{\Delta t}{\varsigma}}\tilde{\tau}_n(t) + \left(1 - e^{-\frac{\Delta t}{\varsigma}}\right)X,$$

X denotes variable that is independent and identically distributed with $\tilde{\tau}_n(t)$, and ç denotes an environment related parameter that describes a correlation of a virtual link, and typical values for ç include 5 s, 7 s, and 30 s. An average power of the clusters are updated, and an average power of a SMC component at a time instant t+Δt and an average power of a DMC component at the time instant t+Δt are updated to $$\bar{P}_{s_n}^{SMC}(t+\Delta t) = \bar{P}_{s_n}^{SMC}(t)\frac{3\tau_n(t) - 2\tau_n(t+\Delta t) + \tau_{s_n}}{\tau_n(t) + \tau_{s_n}}$$

$$\bar{P}_{m_n}^{DMC}(t+\Delta t) = \bar{P}_{m_n}^{DMC}(t)\frac{3\tau_n(t) - 2\tau_n(t+\Delta t) + \tau_{s_n} + \tau_{add}}{\tau_n(t) + \tau_{s_n} + \tau_{add}}.$$

In Step S6, a next time instant is entered, and Step S4 is restored, until all motion trajectories of the transmitters and the motion trajectories of the receivers are traversed. Eventually statistical characteristics of the channel are calculated according to the generated channel coefficients, and a channel model is verified according to actual channel measurement data and the ray tracing simulation data.

In Step S601, a multi-link channel capacity is calculated according to a generated small-scale channel matrix, and a calculation formula is expressed as $$C = E\left\{\log_2\left[\det\left(I_{M_R} + \frac{\rho}{M_T}\hat{H}_{des}^T(\hat{H}_{des}^T)^H I_{M_R}^{-1}\right)\right]\right\},$$

where $\hat{H}_{des} = H_{des}/\sqrt{P}$ denotes a channel transmission matrix of an expected link, P denotes a receiving power, $I_{M_R}$ denotes an identity matrix with a size of $M_R$, det(•) denotes a determinant of a matrix, ρ denotes a signal-to-noise ratio. channel capacities of all measured positions are respectively calculated in a case of the signal-to-noise ratio of −5 dB, 0 dB, 5 dB, and 10 dB, and the channel capacities of all measured positions are fitted with a cumulative distribution function (CDF) of channel measurement results according to a minimum mean square error (MMSE) criterion mean.

In Step S602, a singular value SV for the channel is calculated according to the generated small-scale channel matrix. The singular value for the channel is used to describe a joint orthogonality between different receiving antennas, and the channel transmission matrix H is decomposed into the singular value, $H = U\Sigma V^H$, where U and V denote unitary matrices, and a diagonal matrix Σ contains all singular values.

In Step S603, delay spreads of all receiving antennas and angle spreads of all receiving antennas are calculated according to a generated delay, a power and an angle. The generated results are compared with channel measurements and ray tracings. The calculation formulas of the delay spreads and the angle spreads are respectively expressed as $$DS = \sqrt{\frac{\sum_{l=1}^{L}\tau_l^2 \cdot P_l}{\sum_{l=1}^{L}P_l} - \left(\frac{\sum_{l=1}^{L}\tau_l \cdot P_l}{\sum_{l=1}^{L}P_l}\right)^2}$$

$$AS = \sqrt{\frac{\sum_{l=1}^{L}\theta_l^2 \cdot P_l}{\sum_{l=1}^{L}P_l} - \left(\frac{\sum_{l=1}^{L}\theta_l \cdot P_l}{\sum_{l=1}^{L}P_l}\right)^2},$$

where DS, AS denote a delay spread and an angle spread, respectively, $\tau_l$, $\theta_l$, and $P_l$ denote a delay of the l-th path, an angle of the l-th path, and a power of the l-th path, respectively, and L denotes the number of the multipaths.

The beneficial effects are as follows.

The geometry-based stochastic channel modeling method for the industrial Internet of things channel and the experiment verification method thereof disclosed in the present disclosure take into consideration of both the 6G channel modeling requirements and the dense multipath characteristics of industrial Internet of things for the first time, innovatively divide the industrial internet of things channel impulse response into two parts, that is, SMC and DMC, introduce time delay scale factor $$S_{dmc}^{\tau}$$

and power attenuation factor $\beta_{dmc}$ based on the characteristics of the DMC component, and model in the delay domain, the angle domain, and the power domain, respectively, which eliminates the disadvantages of existing industrial Internet of things channel models that cannot fully reflect the characteristics of industrial Internet of things channels, and has great significance for the researches on industrial Internet of things channel characteristics and the model standardizations through the measurement data and the simulation data verification.

DETAILED DESCRIPTION OF THE EMBODIMENTS

In order to clarify the objectives, the technical solutions, and the advantages of the embodiments of the present disclosure to be more clear, the technical solutions in the embodiments of present disclosure will be clearly and completely described in conjunction with the accompanying drawings. Obviously, the described embodiments are one part of the embodiments of the present disclosure, not all of them. Based on the embodiments in the present disclosure, all other embodiments obtained by a person skilled in the art without creative labor fall within the protection scope of the present disclosure.

Figure 1:
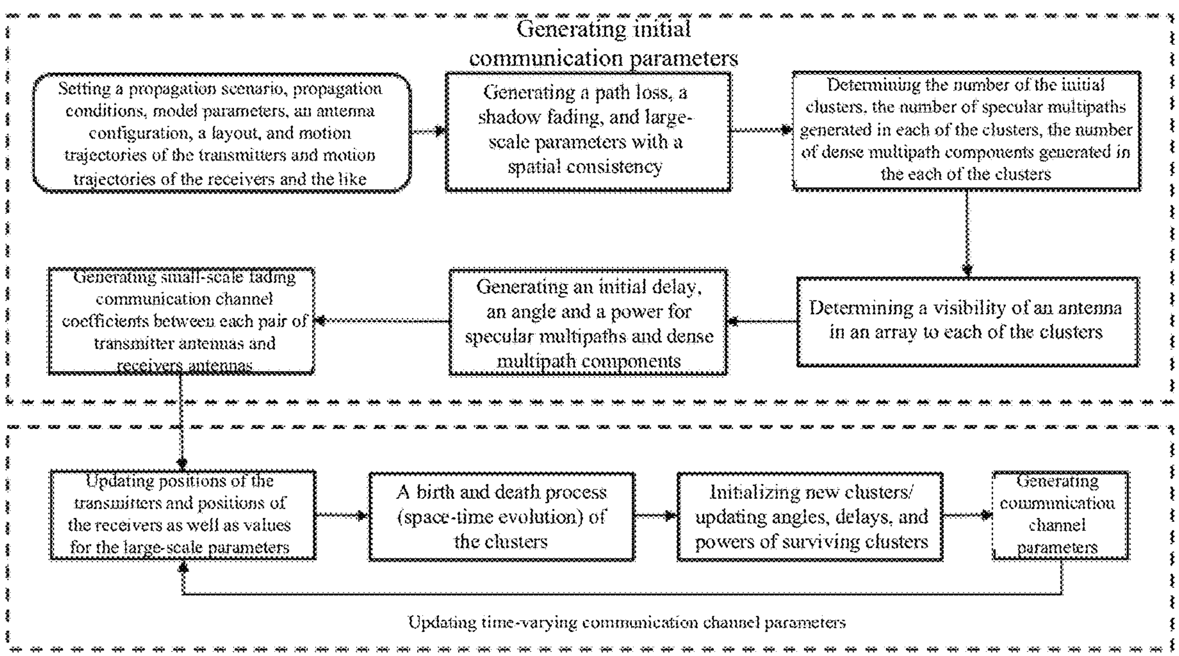
FIG. 1 illustrates a flow chart diagram of an embodiment provided by the present disclosure.
Figure 2:
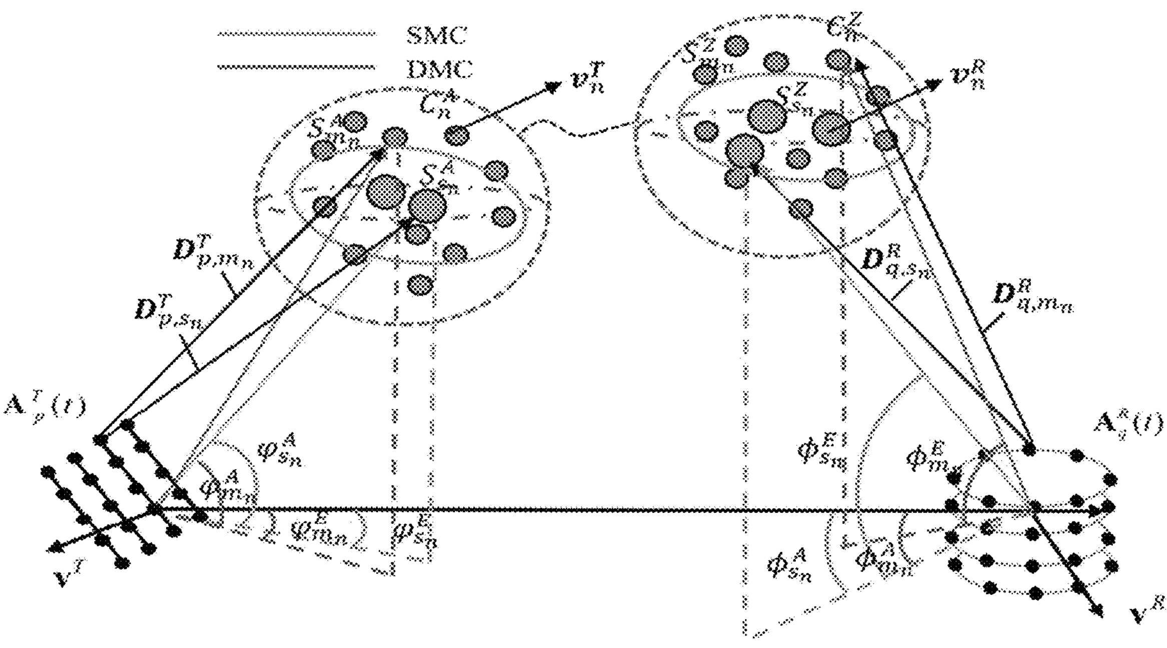
FIG. 2 illustrates a schematic diagram of a geometry-based stochastic channel model for industrial Internet of things provided by the present disclosure.

With reference to FIG. 1, provided in this embodiment is a geometry-based stochastic channel modeling method for an industrial Internet of things channel and an experimental verification method thereof. And the method specifically includes the following steps.

In Step S1, a propagation scenario, propagation conditions, model parameters, an antenna configuration, a layout, and motion trajectories of the transmitters and motion trajectories of the receivers and the like are set.

The model parameters for the simulation scenarios are set according to the channel measurements. In this instance, based on indoor factory channel measurement, a center frequency is set to be 5.5 GHz and a bandwidth is set to be 320 MHz. During actual measurement, the transmitter and receiver are stationary, so the transmitter and receiver speed is 0, and the cluster generation rate and mortality rate are 60 and 4, respectively. A massive MIMO array is adopted in the antenna configuration, in which the transmitting antenna is a 4×4 dual polarization planar array antenna with a horizontal and vertical antenna spacing of 0.029 meters; the receiving antenna is a 4×8 dual polarization cylindrical array antenna with a radius of 0.0615 m and a height of 0.029 m, forming a 32×64 MIMO system. The propagation condition is a LOS scene, with a LOS path.

In Step S2, large-scale parameters with a spatial consistency are generated according to different positions of the transmitters and the receivers measured by an actual channel, and Step S2 specifically includes the following steps.

In Step S201, the coordinate vectors $P=(P^T,P^R)$ for the transmitters and the receivers at different time instants are substituted into the model, and large-scale parameters with a space consistency are generated. The parameters include a shadow fading SH, a delay spread DS, an azimuth spread of arrival ASA, an azimuth spread of departure ASD, an elevation spread of arrival ESA, an elevation spread of departure ESD, a Rice factor K, and a cross polarization ratio XPR. A generation of the delay spread DS is taken as an example, and a mean for generating the large-scale parameters for other large-scale parameters are similar, and the formula is expressed as:

$$DS_f(P) = DS_{\mu,f} + X^{DS}(P)\cdot DS_{\sigma,f},$$

where $P=(P^T,P^R)$ is composed of vectors for the positions of the transmitters and vectors for the positions of the receivers, $P^T(t)=(x^T(t),y^T(t),z^T(t))^T$, and $P^R(t)=(x^R(t),y^R(t),z^R(t))^T$ denote coordinate vectors for the transmitters at a time instant t and coordinate vectors for the receivers at the time instant t, respectively, and initial values for the coordinate vectors for the transmitters and initial values for the coordinate vectors for the receivers are generated according to simulation environment and requirements; $DS_{\mu,f}$ denotes a mean value for DS in a f-th frequency band, and $DS_{\sigma,f}$ denotes a standard deviation for DS in the f-th frequency band; $X^{DS}(P)$ denotes a variable that follows a spatial consistency of a normal distribution with a mean of 0 and a variance of 1, and a generation formula of $X^{DS}(P)$ is expressed as $$\overline{X}^{DS}(x_t, y_t, z_t, x_r, y_r, z_r) = \frac{\tilde{X}^{DS}(x_t, y_t, z_t) + \tilde{X}^{DS}(x_r, y_r, z_r)}{2\cdot\sqrt{\rho_\tau(d_{tr})+1}}$$

$$\rho_\tau(d_{tr}) = \begin{cases} \exp\left(-\frac{d_{tr}^2}{d_\lambda^2}\right), & d_{tr} < d_\lambda \\ \exp\left(-\frac{d_{tr}}{d_\lambda}\right), & d_{tr} \geq d_\lambda \end{cases},$$

where $\tilde{X}^{DS}$ denotes a stochastic variable that follows the normal distribution stochastic with the mean of 0 and the variance of 1 generated by a Sum-of-Sinusoids (SoS) mean, $d_{tr}$ denotes distances between the transmitters and the receivers, and $\rho_\tau(d_{tr})$ denotes an autocorrelation value for $\tilde{X}^{DS}$ in a case of $d=d_{tr}$.

In Step S202, according to the cross-correlation matrix $R^{1/2}$ between the large-scale parameters provided by the indoor factory (InF) of the 3GPP 38.901 standardized model, generated eight large-scale parameters are multiplied by $R^{1/2}$ to obtain the values for all large-scale parameters with the spatial consistency in the logarithmic domain, and which is expressed as following formula. Finally, the values in the logarithmic domain are required to be converted to the linear domain.

$$\begin{bmatrix} X^{DS}(P) \\ X^{KF}(P) \\ X^{SH}(P) \\ X^{ASD}(P) \\ X^{ASA}(P) \\ X^{ESD}(P) \\ X^{ESA}(P) \\ X^{XPR}(P) \end{bmatrix} = R^{1/2} \begin{bmatrix} \overline{X}^{DS}(P) \\ \overline{X}^{KF}(P) \\ \overline{X}^{SH}(P) \\ \overline{X}^{ASD}(P) \\ \overline{X}^{ASA}(P) \\ \overline{X}^{ESD}(P) \\ \overline{X}^{ESA}(P) \\ \overline{X}^{XPR}(P) \end{bmatrix}.$$

In Step S3, the number of the initial clusters, the number of specular multipath components generated in each of clusters and the number of dense multipath components generated in each of the clusters are determined. And a visible probability of the clusters to a MIMO array antenna is determined. An initial delay of the clusters, an angle of the clusters, and a power of the clusters are generated and channel coefficients between each pair of the transmitter antennas and the receiver antennas are generated.

In Step S301, the number of the initial clusters, the number of specular multipath components generated in each of clusters and the number of dense multipath components generated in each of the clusters are determined. And a visibility of the clusters to a MIMO array antenna is determined. The event that "the cluster is visible to the antenna" has a certain probability, that is, the visible probability. The visible probability of the clusters to transmitting antennas and a visible probability of the clusters to receiving antennas on an array axis at an initial time instant are related to the distances between the transmitting antennas and the receiving antennas, and the visible probability of the clusters to the transmitting antennas and the visible probability of the clusters to the receiving antennas are respectively defined as $$\begin{cases} P_T(\|A_p^T - A_{p'}^T\|) = \exp\left(-\lambda_R \dfrac{\|A_p^T - A_{p'}^T\|}{D_c^s}\right) \\ P_R(\|A_q^R - A_{q'}^R\|) = \exp\left(-\lambda_R \dfrac{\|A_q^R - A_{q'}^R\|}{D_c^s}\right) \end{cases},$$

where $$D_c^s$$

denotes a spatial correlation coefficient, $\lambda_R$ denotes a mortality rate of the clusters, $$\|A_p^T - A_{p'}^T\| \text{ and } \|A_q^R - A_{q'}^R\|$$

denote a distance between a transmitting antenna p and a transmitting antenna p', as well as a distance between a receiving antenna and a receiving antenna q', respectively. Then, according to the above described method, the initial delay of the clusters, the angle of the clusters, and the power of the clusters are generated, and the channel coefficients between each pair of transmitter antennas and receiver antennas are generated.

In Step S302, the initial delay of the clusters, the angle of the clusters, and the power of the clusters are generated. In an angle domain, $$[\phi_n^{AOA}, \phi_n^{EOA}, \phi_n^{AOD}, \phi_n^{EOD}]$$

is expressed as an included angle between a center of the clusters and the transmitters or the receivers, and $$[\phi_n^{AOA}, \phi_n^{EOA}, \phi_n^{AOD}, \phi_n^{EOD}]$$

is modeled as a wrapped Gaussian distribution with a standard deviation of $$[\mathrm{std}(\phi_n^A), \mathrm{std}(\phi_n^E), \mathrm{std}(\varphi_n^A), \mathrm{std}(\varphi_n^E)].$$

In view of a SMC, based on the included angle between the center of the clusters, a stochastic Laplace-distributed angle offset with a mean of zero and a standard deviation of 1 degree (0.017 radians) is added, and a motion angle of $S_{s_n}$ and a motion angle of $S_{m_n}$ are obtained, which is expressed as $$[\phi_{n,s_n(m_n)}^{AOA}, \phi_{n,s_n(m_n)}^{EOA}, \phi_{n,s_n(m_n)}^{AOD}, \phi_{n,s_n(m_n)}^{EOD}] = [\phi_n^{AOA}, \phi_n^{EOA}, \phi_n^{AOD}, \phi_n^{EOD}] + [\Delta\phi_{s_n(m_n)}^{AOA}, \Delta\phi_{s_n(m_n)}^{EOA}, \Delta\phi_{s_n(m_n)}^{AOD}, \Delta\phi_{s_n(m_n)}^{EOD}],$$

where $$[\Delta\phi_{s_n}^{AOA}, \Delta\phi_{s_n}^{EOA}, \Delta\phi_{s_n}^{AOD}, \Delta\phi_{s_n}^{EOD}]$$

denotes a stochastic angle offset that follows a Laplace-distributed stochastic angle offset with a mean of zero and a standard deviation of 1 degree (0.017 radians). In view of the DMC, the DMC has a greater angle diffusion than the SMC. The standard deviation $$[\Delta\phi_{m_n}^{AOA}, \Delta\phi_{m_n}^{EOA}, \Delta\phi_{m_n}^{AOD}, \Delta\phi_{m_n}^{EOD}]$$

for the angle offset of the DMC is modeled as a scenario related constant, and 5 degrees are taken here.

In a delay domain, a relay calculation formula for a LOS component and a relay calculation formula for the SMC are respectively expressed as:

$$\tau^{LOS}(t) = \|D_{pq}^{LOS}(t)\|/c$$

-continued $$\tau_{s_n}^{SMC}(t)=\tau_n(t)+\tau_{s_n},\ \tau_n(t)=(\|D_{s_n}^R(t)\|+\|D_{s_n}^T(t)\|)/c+\tilde{\tau}_n,$$

where $$\|D_{pq}^{LOS}(t)\|$$

denotes a distance between the transmitting antenna p and the receiving antenna q, $\tau^{LOS}(t)$ denotes a delay of a line-of-sight path between the transmitting antenna p and the receiving antenna q, $\tau_n(t)$ denotes a delay of a link where the center of the clusters $C_n$ is located, $\tau_{s_n}$ denotes a delay offset caused by a distance offset of $S_{s_n}$ relative to a cluster centroid, following an exponential distribution; and a virtual link delay is expressed as $\tilde{\tau}_n=-r_\tau\sigma_\tau \ln \mu_n$, where $\mu_n \sim U[0,1]$, $r_\tau$ denotes a delay scalar and $\sigma_\tau$ denotes a delay spread. In view of the DMC component, considering that the delay of the DMC is not only caused by the scatterers that are visible to the Tx and the Rx, but also by scattering phenomena caused by the scatterers hidden between the visible scatterers. The introduced delay scale factor $$S_{dmc}^{\tau}>1$$

describes the geometric spread of the DMC. On the basis of the SMC component, an additional DMC delay $\tau_{add}$ caused by the scattering phenomenon of the scatterers between the visible clusters is added, that is $$\tau_{m_n}^{DMC}(t)=\tau_{s_n}^{SMC}(t)+\tau_{add},$$

where, $$\tau_{add}=\xi S_{dmc}^{\tau}\beta_{dmc},\ \xi$$

follows a uniform distribution between 0 and 1, $\beta_{dmc}$ denotes a power attenuation factor, and expresses an additional delay relative to a strongest SMC, and the strongest SMC attenuates a DMC power to 1/e relative to a basic power $P_{s_n}(t)P_{off}$.

In a power domain, a calculation formula for a power of a specular multipath caused by $S_{s_n}$ in the clusters $C_n$ is expressed as:

$$\tilde{P}_{S_n}^{SMC}(t)=\exp\left(-\tau_{S_n}^{SMC}(t)\frac{r_\tau-1}{r_\tau\sigma_\tau}\right)10^{-Z_n/10},$$

where $r_\tau$ denotes a delay scalar, $\sigma_\tau$ denotes a delay spread, $Z_n \sim N(0,\sigma_{cluster})$, and $\sigma_{cluster}$ (dB) denotes a shadow standard deviation of each of the clusters;

a mean for normalizing is expressed as $$P_{s_n}^{SMC}(t)=P_{SMC}(t)\tilde{P}_{s_n}^{SMC}(t)/\sum_{n=1}^{N(t)}\sum_{s=1}^{S_n(t)}\tilde{P}_{s_n}^{SMC}(t),$$

where $P_{SMC}(t)$ denotes a total power of the SMC component;

a calculation formula for a power of a dense multipath caused by $S_{m_n}$ in the clusters $C_n$ is expressed as:

$$\tilde{P}_{m_n}^{DMC}(t)=\max\{P_{s_n}^{SMC}(t)\}\times P_{off}\exp\left(-\frac{\tau_{m_n}^{DMC}(t)-\tau_{s_n}^{SMC}(t)}{\beta_{dmc}}\right),$$

where $$\max\{P_{s_n}^{SMC}(t)\}$$

denotes a SMC with the highest power in the clusters $C_n$, and $P_{off}$ denotes a power offset;

a mean for normalizing is expressed as $$P_{m_n}^{DMC}(t)=P_{DMC}\tilde{P}_{m_n}^{DMC}(t)/\sum_{n=1}^{N(t)}\sum_{m=1}^{M_n(t)}\tilde{P}_{m_n}^{DMC}(t),$$

$P_{DMC}(t)$ denotes a total power of the DMC component.

It is assumed that the DMC power ratio is time invariant, the powers of the SMC and the DMC component can be calculated based on the DMC power ratio $\eta_{DMC}$ and Rice factor:

$$\eta_{DMC}(t)=P_{DMC}(t)/(P_{DMC}(t)+P_{SMC}(t)+P_{LOS}(t)),$$

$$P_{LOS}(t)=K(P_{DMC}(t)+P_{SMC}(t)),$$

where K denotes the Rice factor, $P_{DMC}(t)$, $P_{SMC}(t)$, and $P_{LOS}(t)$ denote a total power of the DMC component, a total power of the SMC component, and a total power of the LOS component, respectively.

A small-scale fading total power is normalized and it is assumed that a DMC power ratio is time-invariant, which is expressed as:

$$P_{DMC}=\eta_{DMC},\ P_{SMC}=\frac{1}{K+1}-\eta_{DMC},\ P_{LOS}=\frac{K}{K+1},$$

where a power of the SMC is positive. Therefore, it is necessary to satisfy $\eta_{DMC}<1/(K+1)$, which also indicates that in the LOS scenarios with relative high K factors, the power ratio of the DMC is limited, and in general, the power ratio of the DMC in NLOS scenarios is greater than that in the LOS scenarios.

In Step S303, the channel coefficients between each pair of the transmitters and the receivers are generated. The small-scale fading, the path loss, and the shadowing are taken into consideration comprehensively, and a matrix of the industrial Internet of things channel is expressed as:

$$H=[PL\cdot SH]^{1/2}\cdot H_s,$$

where PL,SH denote a large-scale fading, PL denotes a path loss, SH denotes the shadowing fading, and $H_s$ denotes a matrix of a small-scale fading channel.

The matrix of a small-scale fading channel $H_s$ is expressed as:

$$H_s(t, \tau) = [h_{qp}(t, \tau)]_{M_T \times M_R},$$

where $M_T$ denotes the number of antenna elements in a transmitting antenna array, $M_R$ denotes the number of antenna elements in a receiving antenna array, $h_{qp}(t,\tau)$ denotes a channel impulse response between a transmitting antenna element $$A_p^T$$

and a receiving antenna element $$A_q^R, \text{ and } h_{qp}(t, \tau)$$

is composed of a LOS component and a NLOS component; and a calculation formula $h_{qp}(t,\tau)$ is expressed as:

$$h_{qp}(t, \tau) = h_{qp}^{LOS}(t)\delta\left[\left(\tau - \tau_{qp}^{LOS}(t)\right)\right] + \sum_{n=1}^{N(t)}\sum_{s=1}^{S_n(t)} h_{qp,s_n}^{SMC}\delta\left[\tau - \tau_{s_n}^{SMC}(t)\right] + \sum_{n=1}^{N(t)}\sum_{m=1}^{M_n(t)} h_{qp,m_n}^{DMC}(t)\delta\left[\tau - \tau_{m_n}^{DMC}(t)\right],$$

where the first item is the LOS component, and the second item and the third item are the SMC and the DMC, respectively; N(t) denotes the number of the clusters, $S_n(t)$ denotes the stochastic number of scatterers that generate the SMC, and $M_n(t)$ denotes the stochastic number of relative small scatterers that generate the DMC; assuming that $S_n(t)$ and $M_n(t)$ follow a Poisson distribution with an arrival rate of $\tilde{\lambda}_{smc}$ and $\tilde{\lambda}_{dmc}$, respectively; and a channel coefficient $$h_{qp}^{LOS}(t)$$

for the LOS component and a channel coefficient $$h_{qp,m_n}^{DMC}(t)$$

for the DMC are expressed as:

$$h_{qp}^{LOS}(t) = \begin{bmatrix} F_{p,V}^T\left(D_{qp}^{LOS}(t), A_p^T(t)\right) \\ F_{p,H}^T\left(D_{qp}^{LOS}(t), A_p^T(t)\right) \end{bmatrix}^T \begin{bmatrix} 1 & 0 \\ 0 & -1 \end{bmatrix} \begin{bmatrix} F_{q,V}^R\left(D_{qp}^{LOS}(t), A_q^R(t)\right) \\ F_{q,H}^R\left(D_{qp}^{LOS}(t), A_q^R(t)\right) \end{bmatrix} \sqrt{P_{LOS}(t)}\, e^{j\left\{2\pi f_{qp}^{LOS}(t)t + \Phi_{qp}^{LOS}(t)\right\}}$$

-continued $$h_{qp,m_n}^{DMC}(t) = \begin{bmatrix} F_{p,V}^T\left(D_{p,m_n}^T(t), A_p^T(t)\right) \\ F_{p,H}^T\left(D_{p,m_n}^T(t), A_p^T(t)\right) \end{bmatrix}^T \begin{bmatrix} e^{j\Phi_{m_n}^{VV}} & \sqrt{\kappa_{m_n}}\, e^{j\Phi_{m_n}^{VH}} \\ \sqrt{\kappa_{m_n}}\, e^{j\Phi_{m_n}^{HV}} & e^{j\Phi_{m_n}^{HH}} \end{bmatrix} \begin{bmatrix} F_{q,V}^R\left(D_{q,m_n}^R(t) A_q^R(t)\right) \\ F_{q,H}^R\left(D_{q,m_n}^R(t), A_q^R(t)\right) \end{bmatrix} \sqrt{P_{m_n}^{DMC}(t)}\, e^{j\left(2\pi\left(f_{q,m_n}^R(t) + f_{p,m_n}^T(t)\right)t + \Phi_{qp,m_n}^{NLOS}(t)\right\}},$$

where $$F_{p,V(H)}^T \text{ and } F_{q,V(H)}^R$$

denote a directional pattern of an antenna unit $$A_p^T$$

corresponding to a vertical polarization and a directional pattern of an antenna unit $$A_q^R$$

corresponding to a horizontal polarization, respectively. $\kappa_{m_n}(t)$ denotes a cross polarization power ratio, $$\Phi_{m_n}^{VH}, \Phi_{m_n}^{VV}, \Phi_{m_n}^{HV} \text{ and } \Phi_{m_n}^{HH}$$

denote stochastic phases that follow a uniform distribution of $(0,2\pi]$, $$\Phi_{qp}^{LOS}(t) = 2\pi\left\|D_{pq}^{LOS}(t)\right\|/\lambda_c \text{ and } \Phi_{qp,mn}^{NLOS}(t) = 2\pi\left(\left\|D_{q,m_n}^R(t) + D_{p,m_n}^T(t)\right\|\right)/\lambda_c$$

denote an initial phase of $$A_q^R$$

under the LOS and an initial phase of $$A_p^T$$

under the NLOS, respectively, and $$f_{p,m_n}^T \text{ and } f_{q,m_n}^R$$

denote a Doppler frequency offset caused by a motion of the transmitting antennas relative to $S_{m_n}$, and a Doppler frequency offset caused by a motion of the receiving antennas relative to $S_{m_n}$ respectively.

$$f^R_{q,m_n}$$

is taken as an example, $$f^R_{q,m_n}(t) = \langle D^R_{q,m_n}(t), v^R - v^R_n \rangle / \lambda_c \| D^R_{q,m_n}(t) \|,$$

where <•,•> denotes an inner product, ||•|| denotes a calculation of Frobenius norm.

$$f^T_{p,s_n}(t),\ f^R_{q,s_n}(t),\ f^T_{p,m_n}(t) \text{ and } f^{LOS}_{qp}(t)$$

can be obtained by similar calculations, respectively.

$$f^T_{p,s_n}(t) \text{ and } f^R_{q,s_n}(t)$$

denote the Doppler frequency offset caused by the relative motion of the transmitter antennas relative to $S_{s_n}$, and the Doppler frequency offset caused by the relative motions of the receiver antennas relative to $S_{s_n}$, respectively.

$$f^{LOS}_{qp}(t)$$

denotes the Doppler frequency offset caused by the relative motions between the transmitter antennas and the receiving antennas.

$$P_{LOS}(t) \text{ and } P^{DMC}_{m_n}(t)$$

denote the power of the LOS component and the power of the DMC component, respectively. All the above parameters are time-varying parameters. The channel coefficient $$h^{SMC}_{qp,s_n}(t)$$

of the SMC component is similar to that of the DMC component and can be obtained by substituting $m_n$ with $s_n$.

In Step S4, the positions of the transmitters and the positions of the receivers as well as values for the large-scale parameters are updated according to the motion trajectories of the transmitters and the motion trajectories of the receivers. The motions of the transmitters and the receivers lead to variations of the position coordinates of the transmitters and the receivers. After a time interval Δt, the coordinates of the antenna are updated to:

$$A^R_q(j+\Delta t) = A^R_q(t) + v^R \Delta t$$

$$A^T_p(t+\Delta t) = A^T_p(t) + v^T \Delta t.$$

Meanwhile, according to the method in Step S2, the coordinate vectors $P=(P^T,P^R)$ of the transmitters and the receivers at different time instants are substituted into the model to update the large-scale parameters for the channel at the time instant t+Δt.

In Step S5, a birth and death process of the clusters is applied to initialize new clusters and update angles, delays and powers of surviving clusters, and the channel coefficients are generated, the steps are specifically includes following steps.

In Step S501, the birth and death process of the clusters is classified into a birth and death process on a time axis and a birth and death process on an array axis, on the time axis, a visible probability of the clusters after a time interval Δt is expressed as:

$$P_T(\Delta t) = \exp\left(-\lambda_R \frac{P_F(\Delta v^R + \Delta v^T)\Delta t}{D^s_c}\right),$$

where $$\Delta v^R = E[\|v^R - v^R_n\|] \text{ and } \Delta v^T = E[\|v^T - v^T_n\|]\Delta v^T = E[\|v^T - v^T_n\|]$$

denote an average relative velocity of $\text{Cluster}_n$ relative to the receiving antennas and average relative velocity of $\text{Cluster}_n$ relative to the transmitting antennas, respectively, $P_F$ denotes a percentage of moving clusters; new clusters are generated at a time instant t+Δt, the number of newly generated clusters follows a Poisson distribution, and an expectation is expressed as:

$$E[N_{new}(t+\Delta t)] = \frac{\lambda_G}{\lambda_R}(1 - P_T(\Delta t)),$$

where on the array axis, a visibility of the newly generated clusters to antennas is determined by a relevant distance; the relevant distance r is defined as an exponential distribution variable, $$E[r] = \lambda_R / D^a_c, \text{ where } D^a_c$$

is a parameter related to environment. The receiving array is taken as an example, in a case of determining antennas to which the newly generated clusters $\text{Cluster}_n$ are visible, firstly, a receiving antenna $p_0$ is randomly selected and $\text{Cluster}_n$ is determined to be visible to $p_0$; then, for other antennas, when satisfying $$\|A^R_{p_i} - A^R_{p_0}\| \le r,$$

$\text{Cluster}_n$ is determined to be visible to an antenna $p_i$, otherwise, $\text{Cluster}_n$ is determined to be invisible to the antenna $p_i$.

In Step S502, after the time interval Δt, a variation of coordinates of the transmitting antennas and the receiving antennas, a distance coordinate vector for the clusters, and a delay of the clusters are updated to:

$$D_n^R(t+\Delta t)=D_n^R(t)+v_n^R\Delta t$$

$$D_n^T(t+\Delta t)=D_n^T(t)+v_n^T\Delta t$$

$$\tau_n(t+\Delta t)=\left[\left\|D_n^R(t+\Delta t)\right\|+\left\|D_n^T(t+\Delta t)\right\|\right]/c+\tilde{\tau}_n(t+\Delta t),$$

where a stochastic variable $\tilde{\tau}_n(t+\Delta t)$ is modeled as $$\tilde{\tau}_n(t+\Delta t)=e^{-\frac{\Delta t}{\varsigma}}\tilde{\tau}_n(t)+\left(1-e^{-\frac{\Delta t}{\varsigma}}\right)X,$$

X denotes variable that is independent and identically distributed with $\tilde{\tau}_n(t)$, and ç denotes an environment related parameter that describes a correlation of a virtual link, Typical values for ç include 5 s, 7 s, and 30 s. An average power of the clusters are updated, and an average power of a SMC component at a time instant t+Δt and an average power of a DMC component at the time instant t+Δt are updated to:

$$\tilde{P}_{s_n}^{SMC}(t+\Delta t)=\tilde{P}_{s_n}^{SMC}(t)\frac{3\tau_n(t)-2\tau_n(t+\Delta t)+\tau_{s_n}}{\tau_n(t)+\tau_{s_n}}$$

$$\tilde{P}_{m_n}^{DMC}(t+\Delta t)=\tilde{P}_{m_n}^{DMC}(t)\frac{3\tau_n(t)-2\tau_n(t+\Delta t)+\tau_{s_n}+\tau_{add}}{\tau_n(t)+\tau_{s_n}+\tau_{add}}.$$

In Step S6, a next time instant is entered, and Step S4 is restored, until all motion trajectories of the transmitters and the motion trajectories of the receivers are traversed. Eventually statistical characteristics of the channel are calculated according to the generated channel coefficients, and a channel model is verified according to actual channel measurement data and the ray tracing simulation data. And the step includes following steps.

Figure 3:
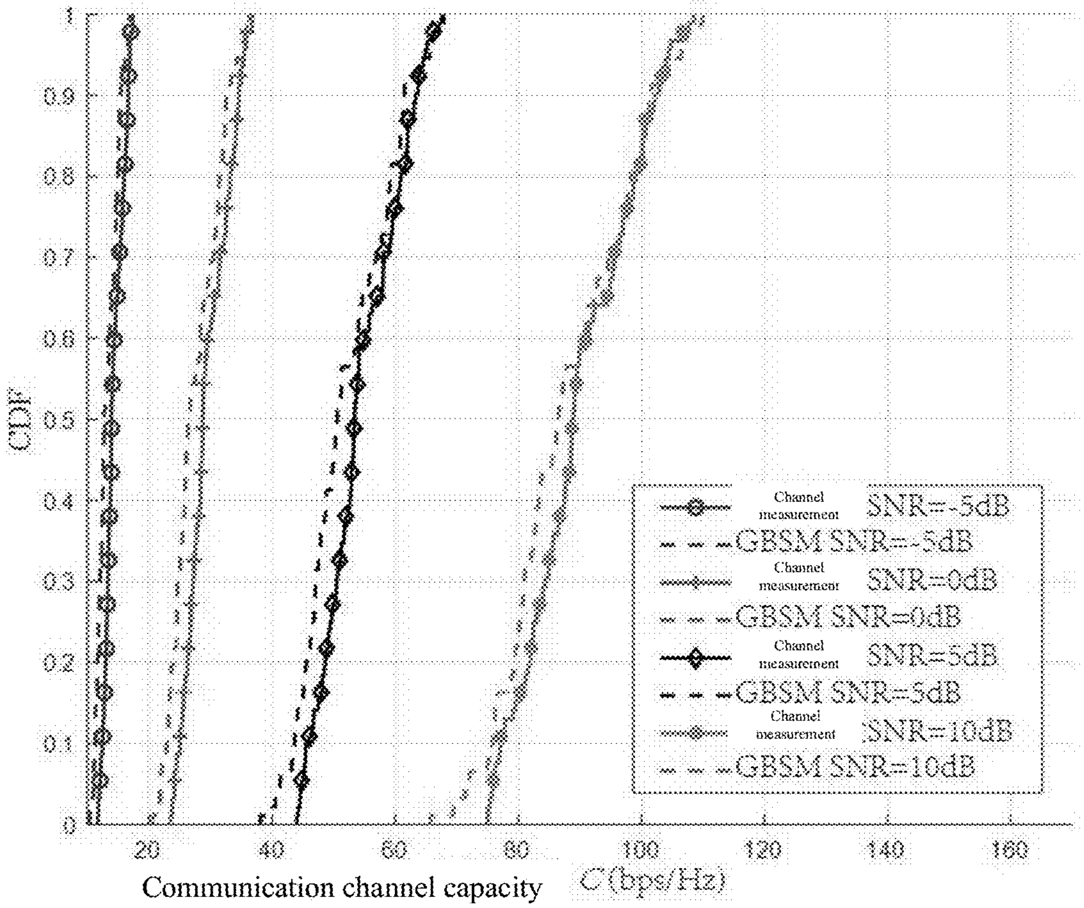
FIG. 3 illustrates a comparison schematic diagram between a GBSM and a channel measurement channel capacity provided by present disclosure.

In Step S601, a multi-link channel capacity is calculated according to a generated small-scale channel matrix, and a calculation formula is expressed as:

$$C=E\left\{\log_2\left[\det\left(I_{M_R}+\frac{\rho}{M_T}\hat{H}_{des}^T(\hat{H}_{des}^T)^H I_{M_R}^{-1}\right)\right]\right\},$$

where $\hat{H}_{des}=H_{des}/\sqrt{P}$ denotes a channel transmission matrix of an expected link, P denotes a receiving power, $I_{M_R}$ denotes an identity matrix with a size of $M_R$, det(•) denotes a determinant of a matrix, ρ denotes a signal-to-noise ratio. channel capacities of all measured positions are respectively calculated in a case of the signal-to-noise ratio of −5 dB, 0 dB, 5 dB, and 10 dB, and the channel capacities of all measured positions are fitted with a cumulative distribution function (CDF) of channel measurement results according to a minimum mean square error (MMSE) criterion mean. FIG. 3 illustrates a comparison schematic diagram between a GBSM and a channel measurement channel capacity in a specific implementation of the present disclosure.

Figures 4, 5:
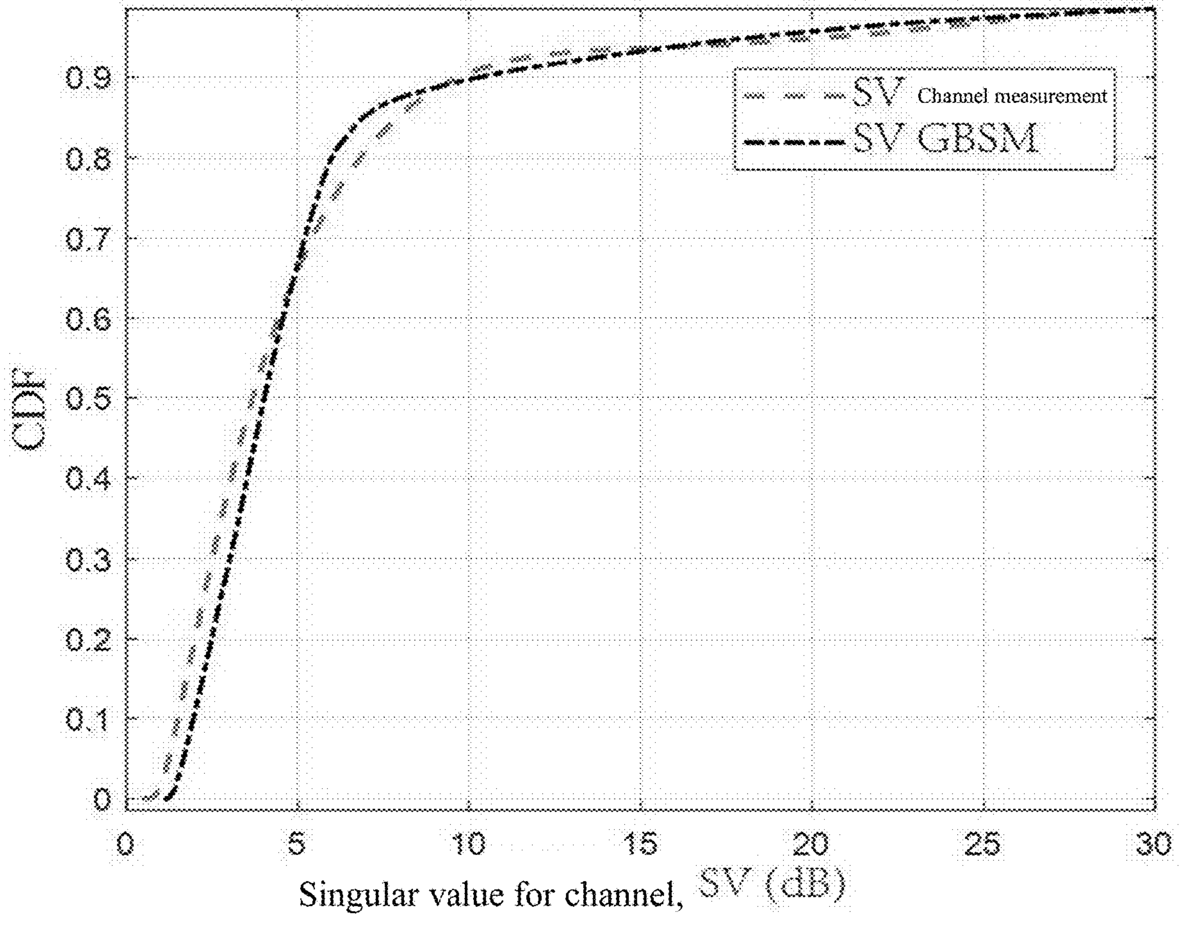
FIG. 4 illustrates a comparison schematic diagram between singular values for GBSM and channel measurement channels provided by present disclosure.
FIG. 5 illustrates schematic diagrams of comparing the GBSM with a channel measurement, a ray tracing simulation delay spread, and a departure angle spread provided by the present disclosure.

In Step S602, a singular value (SV) for the channel is calculated according to the generated small-scale channel matrix. The singular value for the channel is used to describe a joint orthogonality between different receiving antennas, and the channel transmission matrix H is decomposed into the singular value, $H=U\Sigma V^H$, where U and V denote unitary matrices, and a diagonal matrix Σ contains all singular values. FIG. 4 illustrates a comparison schematic diagram between the singular values for GBSM and channel measurement channels in a specific implementation of the present disclosure.

In Step S603, delay spreads of all receiving antennas and angle spreads of all receiving antennas are calculated according to a generated multipath delay, a power and an angle. The generated results are compared with channel measurements and ray tracings. The calculation formulas of the delay spreads and the angle spread are respectively expressed as:

$$DS=\sqrt{\frac{\sum_{l=1}^L\tau_l^2\cdot P_l}{\sum_{l=1}^L P_l}-\left(\frac{\sum_{l=1}^L\tau_l\cdot P_l}{\sum_{l=1}^L P_l}\right)^2}$$

$$AS=\sqrt{\frac{\sum_{l=1}^L\theta_l^2\cdot P_l}{\sum_{l=1}^L P_l}-\left(\frac{\sum_{l=1}^L\theta_l\cdot P_l}{\sum_{l=1}^L P_l}\right)^2},$$

where DS, AS denote a delay spread and an angle spread, respectively, $\tau_l$, $\theta_l$, and $P_l$ denote a delay of the l-th path, an angle of the l-th path, and a power of the l-th path, respectively, and L denotes the number of the multipaths. FIG. 5 illustrates schematic diagrams of comparing the GBSM with the channel measurements, a ray tracing simulation delay spread, and a departure angle spread in the present disclosure.

What is claimed is:

1. A geometry-based stochastic channel modeling method for an industrial Internet of things channel, wherein a massive Multiple-Input-Multiple-Output (MIMO) array is both adopted by transmitters and receivers, and the method comprises following steps:

Step S1, setting a propagation scenario, propagation conditions, model parameters, an antenna configuration, a layout, and motion trajectories of the transmitters and motion trajectories of the receivers;

Step S2, generating, according to different positions of the transmitters and the receivers measured by an actual channel, large-scale parameters with a space consistency;

Step S3, determining a number of initial clusters, a number of specular multipath components generated in each of clusters and a number of dense multipath components generated in each of the clusters, determining, a visible probability of the clusters to a Multiple-Input-Multiple-Output (MIMO) array antenna, generating an initial delay of the clusters, an angle of the clusters, and a power of the clusters, and generating channel coefficients between each pair of transmitter antennas and receiver antennas;

Step S4, updating, according to the motion trajectories of the transmitters and the motion trajectories of the receivers, the positions of the transmitters and the positions of the receivers as well as values for the large-scale parameters;

Step S5, applying a birth and death process of the clusters to initialize new clusters and update angles, delays and powers of surviving clusters, and generating the channel coefficients; and Step S6, entering a next time instant, and returning to Step S4, until traversing all the motion trajectories of the transmitters and all the motion trajectories of the receivers; eventually calculating, according to the generated channel coefficients, statistical characteristics of the industrial Internet of things channel, and verifying, according to actual measured data, a channel model.

2. The geometry-based stochastic channel modeling method for the industrial Internet of things channel according to claim 1, wherein the large-scale parameters include a shadowing SH, a delay spread DS, an azimuth spread of arrival ASA, an azimuth spread of departure ASD, an elevation spread of arrival ESA, an elevation spread of departure ESD, a Rice factor K, and a cross-polarization ratio XPR.

3. The geometry-based stochastic channel modeling method for the industrial Internet of things channel according to claim 2, expressing, by taking a generation of the delay spread DS as an example, a mean for generating the large-scale parameters as:

$$DS_f(P) = DS_{\mu,f} + X^{DS}(P)\cdot DS_{\sigma,f},$$

where $P=(P^T,P^R)$ is composed of vectors for the positions of the transmitters and vectors for the positions of the receivers, $P^T(t)=(x^T(t),y^T(t),z^T(t))^T$, and $P^R(t)=(x^R(t),y^R(t),z^R(t))^T$ denote coordinate vectors for the transmitters at a time instant t and coordinate vectors for the receivers at the time instant t, respectively, and initial values for the coordinate vectors for the transmitters and initial values for the coordinate vectors for the receivers are generated according to simulation environment and requirements; $DS_{\mu,f}$ denotes a mean value for DS in an f-th frequency band, and $DS_{\sigma,f}$ denotes a standard deviation for DS in the f-th frequency band; $X^{DS}(P)$ denotes a variable that follows a spatial consistency of a normal distribution with a mean of 0 and a variance of 1, and a generation formula of $X^{DS}(P)$ is expressed as $$\bar{X}^{DS}(x_t, y_t, z_t, x_r, y_r, z_r) = \frac{\tilde{X}^{DS}(x_t, y_t, z_t) + \tilde{X}^{DS}(x_r, y_r, z_r)}{2\cdot\sqrt{\rho_\tau(d_{tr})+1}},$$

$$\rho_\tau(d_{tr}) = \begin{cases} \exp\left(-\frac{d_{tr}^2}{d_\lambda^2}\right), & d_{tr} < d_\lambda \\ \exp\left(-\frac{d_{tr}}{d_\lambda}\right), & d_{tr} \geq d_\lambda \end{cases},$$

where $\tilde{X}^{DS}$ denotes a stochastic variable that follows the normal distribution with the mean of 0 and the variance of 1 generated by a Sum-of-Sinusoids mean, $d_{tr}$ denotes distances between the transmitters and the receivers, $d_\lambda$ denotes a parameter decorrelation distance; $\rho_\tau(d_{tr})$ denotes an autocorrelation value for $\tilde{X}^{DS}$ in a case of $d=d_{tr}$; and multiplying, after independently generating each of the large-scale parameters, the generated large-scale parameters by a cross-correlation matrix $R^{1/2}$ between the large-scale parameters, obtaining values for all the large-scale parameters with the spatial consistency in a logarithmic domain; and then, converting the values in the logarithmic domain to a linear domain.

4. The geometry-based stochastic channel modeling method for the industrial Internet of things channel according to claim 1, wherein steps of determining the visible probability of the clusters to the Multiple-Input-Multiple-Output (MIMO) array antenna specifically include:

a visible probability of the clusters to transmitting antennas and a visible probability of the clusters to receiving antennas on an array axis at an initial time instant relating to the distances between the transmitting antennas and the receiving antennas, and respectively defining the visible probability of the clusters to the transmitting antennas and the visible probability of the clusters to the receiving antennas as $$\begin{cases} P_T(\|A_p^T - A_{p'}^T\|) = \exp\left(-\lambda_R \frac{\|A_p^T - A_{p'}^T\|}{D_c^s}\right) \\ P_R(\|A_q^R - A_{q'}^R\|) = \exp\left(-\lambda_R \frac{\|A_q^R - A_{q'}^R\|}{D_c^s}\right) \end{cases},$$

where $$D_c^s$$

denotes a spatial correlation coefficient, $\lambda_R$ denotes a mortality rate of the clusters, $$\|A_p^T - A_{p'}^T\| \text{ and } \|A_q^R - A_{q'}^R\|$$

denote a distance between a transmitting antenna p and a transmitting antenna p', as well as a distance between a receiving antenna and a receiving antenna q', respectively.

5. The geometry-based stochastic channel modeling method for the industrial internet of things channel according to claim 1, wherein steps of generating the initial delay of the clusters, the angle of the clusters, and the power of the clusters specifically include:

in an angle domain, denoting $$[\phi_n^{AOA}, \phi_n^{EOA}, \phi_n^{AOD}, \phi_n^{EOD}]$$

as an included angle between a center of the clusters and the transmitters or the receivers, modeling $$[\phi_n^{AOA}, \phi_n^{EOA}, \phi_n^{AOD}, \phi_n^{EOD}]$$

as a wrapped Gaussian distribution with a standard deviation of $$[std(\phi_n^A), std(\phi_n^E), std(\varphi_n^A), std(\varphi_n^E)];$$

adding, based on the included angle between the center of the clusters, a stochastic Laplace-distribution angle offset with a mean of zero and a standard deviation of 1 degree in view of a SMC component, obtaining a motion angle of $S_{s_n}$ and a motion angle of $S_{m_n}$; and modeling a standard deviation of a DMC angle offset as a scenario related constant;

in a delay domain, respectively expressing a relay calculation formula for a LOS component and a relay calculation formula for the SMC component as:

$$\tau^{LOS}(t) = \left\| D_{pq}^{LOS}(t) \right\| / c,$$

$$\tau_{s_n}^{SMC}(t) = \tau_n(t) + \tau_{s_n},$$

$$\tau_n(t) = \left( \left\| D_{s_n}^{R}(t) \right\| + \left\| D_{s_n}^{T}(t) \right\| \right) / c + \tilde{\tau}_n,$$

where $$\left\| D_{pq}^{LOS}(t) \right\|$$

denotes a distance between the transmitting antenna p and the receiving antenna q, $\tau^{LOS}(t)$ denotes a delay of a line-of-sight path between the transmitting antenna p and the receiving antenna q, $\tau_n(t)$ denotes a delay of a link where the center of the clusters $C_n$ is located, $\tau_{s_n}$ denotes a delay offset caused by a distance offset of $S_{s_n}$ relative to a cluster centroid, following an exponential distribution; and expressing a virtual link delay as $\tilde{\tau}_n = -r_\tau \sigma_\tau \ln \mu_n$, where $\mu_n \sim U[0,1]$, $r_\tau$ denotes a delay scalar and $\sigma_\tau$ denotes a delay spread;

expressing a delay calculation formula for the DMC component as:

$$\tau_{m_n}^{DMC}(t) = \tau_{s_n}^{SMC}(t) + \tau_{add},$$

where $$S_{dmc}^{\tau} > 1$$

denotes a delay scale factor describing a geometric spread of the DMC, $$\tau_{add} = \xi S_{dmc}^{\tau} \beta_{dmc}$$

denotes an additional delay of the DMC caused by a scattering phenomenon from scatterers between visible clusters on the basis of the SMC component, $\xi$ follows a uniform distribution between 0 and 1, $\beta_{dmc}$ denotes a power attenuation factor, and expresses an additional delay relative to a strongest SMC, and the strongest SMC attenuates a DMC power to 1/e relative to a basic power $P_{s_n}(t)P_{off}$;

in a power domain, expressing a calculation formula for a power of a specular multipath caused by $S_{s_n}$ in the clusters $C_n$ as:

$$\tilde{P}_{S_n}^{SMC}(t) = \exp\left( -\tau_{S_n}^{SMC}(t) \frac{r_\tau - 1}{r_\tau \sigma_\tau} \right) 10^{-Z_n/10},$$

where $r_\tau$ denotes a delay scalar, $\sigma_\tau$ denotes a delay spread, $Z_n \sim N(0, \sigma_{cluster})$, and $\sigma_{cluster}$ (dB) denotes a shadowing fading of each of the clusters;

expressing a mean for normalizing as $$P_{s_n}^{SMC}(t) = P_{SMC} \tilde{P}_{s_n}^{SMC}(t) / \sum_{n=1}^{N(t)} \sum_{s=1}^{S_n(t)} \tilde{P}_{s_n}^{SMC}(t),$$

where $P_{SMC}(t)$ denotes a total power of the SMC component;

expressing a calculation formula for a power of a dense multipath caused by $S_{m_n}$ in the clusters $C_n$ as:

$$\tilde{P}_{m_n}^{DMC}(t) = \max\left\{ P_{s_n}^{SMC}(t) \right\} \times P_{off} \exp\left( -\frac{\tau_{m_n}^{DMC}(t) - \tau_{s_n}^{SMC}(t)}{\beta_{dmc}} \right),$$

where $$\max\left\{ P_{s_n}^{SMC}(t) \right\}$$

denotes a SMC with a highest power in the clusters $C_n$, and $P_{off}$ denotes a power offset;

expressing a mean for normalizing as $$P_{m_n}^{DMC}(t) = P_{DMC} \tilde{P}_{m_n}^{DMC}(t) / \sum_{n=1}^{N(t)} \sum_{m=1}^{M_n(t)} \tilde{P}_{m_n}^{DMC}(t),$$

where $P_{DMC}(t)$ denotes a total power of the DMC component;

expressing a power of the DMC as:

$$\eta_{DMC}(t) = P_{DMC}(t) / (P_{DMC}(t) + P_{SMC}(t) + P_{LOS}(t)),$$

$$P_{LOS}(t) = K(P_{DMC}(t) + P_{SMC}(t)),$$

where K denotes the Rice factor, $P_{DMC}(t)$, $P_{SMC}(t)$, and $P_{LOS}(t)$ denote a total power of the DMC component, a total power of the SMC component, and a total power of the LOS component, respectively; and normalizing a small-scale fading total power and assuming that a DMC power ratio is time-invariant, and expressing as:

$$P_{DMC} = \eta_{DMC},$$

$$P_{SMC} = \frac{1}{K+1} - \eta_{DMC},$$

$$P_{LOS} = \frac{K}{K+1},$$

where a power of the SMC is positive.

6. The geometry-based stochastic channel modeling method for the industrial internet of things channel according to claim 1, wherein steps of generating the channel coefficients between each pair of the transmitters and the receivers specifically include:

expressing a matrix of the industrial internet of things channel as:

$$H = [PL \cdot SH]^{1/2} \cdot H_s,$$

where PL,SH denote a large-scale fading, PL denotes a path loss, SH denotes the shadowing fading, and $H_s$ denotes a matrix of a small-scale fading channel;

expressing the matrix of a small-scale fading channel $H_s$ as:

$$H_s(t,\tau)=[h_{qp}(t,\tau)]_{M_T\times M_R},$$

where $M_T$ denotes a number of antenna elements in a transmitting antenna array, $M_R$ denotes a number of antenna elements in a receiving antenna array, $h_{qp}(t,\tau)$ denotes a channel impulse response between a transmitting antenna element $$A_p^T$$

and a receiving antenna element $$A_q^R, \text{ and } h_{qp}(t,\tau)$$

is composed of a line-of-sight LOS component and a non-line-of-sight NLOS component; expressing a calculation formula $h_{qp}(t,\tau)$ as:

$$h_{qp}(t,\tau)=h_{qp}^{LOS}(t)\delta\left[\left(\tau-\tau_{qp}^{LOS}(t)\right)\right]+\sum_{n=1}^{N(t)}\sum_{s=1}^{S_n(t)}h_{qp,s_n}^{SMC}\delta\left[\tau-\tau_{s_n}^{SMC}(t)\right]+\sum_{n=1}^{N(t)}\sum_{m=1}^{M_n(t)}h_{qp,m_n}^{DMC}(t)\delta\left[\tau-\tau_{m_n}^{DMC}(t)\right],$$

where a first item is the LOS component, and a second item and a third item are the SMC and the DMC, respectively; N(t) denotes a number of the clusters, $S_n(t)$ denotes a stochastic number of scatterers that generate the SMC, and $M_n(t)$ denotes a stochastic number of relative small scatterers that generate the DMC; assuming that $S_n(t)$ and $M_n(t)$ follow a Poisson distribution with an arrival rate of $\tilde{\lambda}_{smc}$ and $\tilde{\lambda}_{dmc}$, respectively; expressing a channel coefficient $$h_{qp}^{LOS}(t)$$

for the LOS component and a channel coefficient $$h_{qp,m_n}^{DMC}(t)$$

for the DMC as:

$$h_{qp}^{LOS}(t)=\begin{bmatrix}F_{p,V}^T\left(D_{qp}^{LOS}(t),A_p^T(t)\right)\\F_{p,H}^T\left(D_{qp}^{LOS}(t),A_p^T(t)\right)\end{bmatrix}^T\begin{bmatrix}1&0\\0&-1\end{bmatrix}\begin{bmatrix}F_{q,V}^R\left(D_{qp}^{LOS}(t),A_q^R(t)\right)\\F_{q,H}^R\left(D_{qp}^{LOS}(t),A_q^R(t)\right)\end{bmatrix}\sqrt{P_{LOS}(t)}\,e^{j\left\{2\pi f_{qp}^{LOS}(t)t+\Phi_{qp}^{LOS}(t)\right\}},$$

$$h_{qp,m_n}^{DMC}(t)=\begin{bmatrix}F_{p,V}^T\left(D_{p,m_n}^T(t),A_p^T(t)\right)\\F_{p,H}^T\left(D_{p,m_n}^T(t),A_p^T(t)\right)\end{bmatrix}^T\begin{bmatrix}e^{j\Phi_{m_n}^{VV}}&\sqrt{\kappa_{m_n}}\,e^{j\Phi_{m_n}^{HV}}\\\sqrt{\kappa_{m_n}}\,e^{j\Phi_{m_n}^{HV}}&e^{j\Phi_{m_n}^{HH}}\end{bmatrix}$$

-continued $$\begin{bmatrix}F_{q,V}^R\left(D_{q,m_n}^R(t),A_q^R(t)\right)\\F_{q,H}^R\left(D_{q,m_n}^R(t),A_q^R(t)\right)\end{bmatrix}\sqrt{P_{m_n}^{DMC}(t)}\,e^{j\left\{2\pi f_{q,m_n}^R(t)+f_{p,m_n}^T(t)\right)t+\Phi_{qp,m_n}^{NLOS}(t)\right\}},$$

where $$F_{p,V(H)}^T \text{ and } F_{q,V(H)}^R$$

denote a directional pattern of an antenna unit $$A_p^T$$

corresponding to a vertical polarization and a directional pattern of an antenna unit $$A_q^R$$

corresponding to a horizontal polarization, respectively. $\kappa_{m_n}(t)$ denotes a cross polarization power ratio $$\Phi_{m_n}^{VH},\ \Phi_{m_n}^{VV},\ \Phi_{m_n}^{HV} \text{ and } \Phi_{m_n}^{HH}$$

denote stochastic phases that follow a uniform distribution of $(0,2\pi]$, $$\Phi_{qp}^{LOS}(t)=2\pi\left\|D_{pq}^{LOS}(t)\right\|/\lambda_c \text{ and } \Phi_{qp,m_n}^{NLOS}(t)=2\pi\left(\left\|D_{q,m_n}^R(t)+D_{p,m_n}^T(t)\right\|\right)/\lambda_c$$

denote an initial phase of $$A_q^R$$

under the LOS and an initial phase of $$A_p^T$$

under the NLOS, respectively, and $$f_{p,m_n}^T \text{ and } f_{q,m_n}^R$$

denote a Doppler frequency offset caused by a motion of the transmitting antennas relative to $S_{m_n}$, and a Doppler frequency offset caused by a motion of the receiving antennas relative to $S_{m_n}$, respectively.

7. The geometry-based stochastic channel modeling method for the industrial internet of things channel according to claim 1, wherein Step S5 specifically includes:

Step S501, classifying the birth and death process of the clusters into a birth and death process on a time axis and a birth and death process on an array axis, expressing, on the time axis, a visible probability of the clusters after a time interval Δt as:

$$P_T(\Delta t) = \exp\left(-\lambda_R \frac{P_F(\Delta v^R + \Delta v^T)\Delta t}{D_c^s}\right),$$

where $$\Delta v^R = E[\|v^R - v_n^R\|] \text{ and } \Delta v^T = E[\|v^T - v_n^T\|]\Delta v^T = E[\|v^T - v_n^T\|]$$

denote an average relative velocity of $Cluster_n$ relative to the receiving antennas and average relative velocity of $Cluster_n$ relative to the transmitting antennas, respectively, $P_F$ denotes a percentage of moving clusters; new clusters are generated at a time instant t+Δt, a number of the newly generated clusters follows a Poisson distribution, and an expectation is expressed as:

$$E[N_{new}(t + \Delta t)] = \frac{\lambda_G}{\lambda_R}(1 - P_T(\Delta t)),$$

where on the array axis, a visibility of the newly generated clusters to antennas is determined by a relevant distance; the relevant distance r is defined as an exponential distribution variable, $$E[r] = \lambda_R / D_c^a, \text{ where } D_c^a$$

is a parameter related to environment;

taking a receiving array as an example, firstly, stochastically selecting, in a case of determining antennas to which the newly generated clusters $Cluster_n$ are visible, a receiving antenna $p_0$, and determining that $Cluster_n$ are visible to $p_0$; then, for other antennas, determining, when satisfying $$\|A_{p_i}^R - A_{p_0}^R\| \leq r,$$

that $Cluster_n$ is visible to an antenna $p_i$, determining, otherwise, that $Cluster_n$ is invisible to the antenna $p_i$;

Step S502, updating, after the time interval Δt, a variation of coordinates of the transmitting antennas and the receiving antennas, a distance coordinate vector for the clusters, and a delay of the clusters to:

$$D_n^R(t + \Delta t) = D_n^R(t) + v_n^R \Delta t$$

$$D_n^T(t + \Delta t) = D_n^T(t) + v_n^T \Delta t$$

$$\tau_n(t + \Delta t) = [\|D_n^R(t + \Delta \mathrm{t})\| + \|D_n^T(t + \Delta \mathrm{t})\|]/c + \tilde{\tau}_n(t + \Delta t),$$

where a stochastic variable $\tilde{\tau}_n$(t+Δt) is modeled as $$\tilde{\tau}_n(t + \Delta t) = e^{-\frac{\Delta t}{\varsigma}} \tilde{\tau}_n(t) + \left(1 - e^{-\frac{\Delta t}{\varsigma}}\right)X,$$

X denotes variable that is independent and identically distributed with $\tilde{\tau}_n$(t), and ç denotes an environment related parameter that describes a correlation of a virtual link; an average power of a SMC component at the time instant t+Δt and an average power of a DMC component at the time instant t+Δt are updated to:

$$\tilde{P}_{s_n}^{SMC}(t + \Delta t) = \tilde{P}_{s_n}^{SMC}(t) \frac{3\tau_n(t) - 2\tau_n(t + \Delta t) + \tau_{s_n}}{\tau_n(t) + \tau_{s_n}}$$

$$\tilde{P}_{m_n}^{DMC}(t + \Delta t) = \tilde{P}_{m_n}^{DMC}(t) \frac{3\tau_n(t) - 2\tau_n(t + \Delta t) + \tau_{s_n} + \tau_{add}}{\tau_n(f) + \tau_{s_n} + \tau_{add}}.$$

8. The geometry-based stochastic channel modeling method for the industrial internet of things channel according to claim 1, wherein Step S6 specifically includes:

Step S601, calculating, according to a generated small-scale fading channel matrix, a multi-link channel capacity, and expressing a calculation formula as:

$$C = E\left\{\log_2\left[\det\left(I_{M_R} + \frac{\rho}{M_T}\hat{H}_{des}^T(\hat{H}_{des}^T)^H I_{M_R}^{-1}\right)\right]\right\},$$

where $\hat{H}_{des} = H_{des}/\sqrt{P}$ denotes a channel transmission matrix of an expected link, P denotes a receiving power, $I_{M_R}$ denotes an identity matrix with a size of $M_R$, det(•) denotes a determinant of a matrix, ρ denotes a signal-to-noise ratio; and respectively calculating, in a case of the signal-to-noise ratio of −5 dB, 0 dB, 5 dB, and 10 dB, channel capacities of all measured positions, fitting, according to a minimum mean square error (MMSE) criterion mean, the channel capacities with a cumulative distribution function (CDF) of channel measurement results;

Step S602, calculating, according to the generated small-scale fading channel matrix, a singular value (SV) for the channel; wherein the singular value for the channel is used to describe a joint orthogonality between different receiving antennas, and the channel transmission matrix H is decomposed into the singular value, $H = U\Sigma V^H$, where U and V denote unitary matrices, and a diagonal matrix Σ contains all singular values;

Step S603, calculating, according to a generated delay, a power and an angle, delay spreads of all receiving antennas and angle spreads of all receiving antennas; comparing generated results with channel measurements and ray tracings; and respectively expressing calculation formulas of the delay spreads and the angle spread as:

$$DS = \sqrt{\frac{\sum_{l=1}^{L} \tau_l^2 \cdot P_l}{\sum_{l=1}^{L} P_l} - \left(\frac{\sum_{l=1}^{L} \tau_l \cdot P_l}{\sum_{l=1}^{L} P_l}\right)^2}$$

$$AS = \sqrt{\frac{\sum_{l=1}^{L} \theta_l^2 \cdot P_l}{\sum_{l=1}^{L} P_l} - \left(\frac{\sum_{l=1}^{L} \theta_l \cdot P_l}{\sum_{l=1}^{L} P_l}\right)^2},$$

where DS, AS denote a delay spread and an angle spread, respectively, $\tau_l$, $\theta_l$, and $P_l$ denote a delay of a l-th path, an angle of the l-th path, and a power of the l-th path, respectively, and L denotes a number of the multipaths.

* * * * *